(12) United States Patent
Han et al.

(10) Patent No.: US 11,242,031 B2
(45) Date of Patent: Feb. 8, 2022

(54) METHOD AND APPARATUS FOR AUTHENTICATING VEHICLE SMART KEY

(71) Applicant: Samsung Electronics Co., Ltd., Suwon-si (KR)

(72) Inventors: Kwanghoon Han, Suwon-si (KR); Kiseok Lee, Yongin-si (KR); Janghee Lee, Seongnam-si (KR); Sungmin Jo, Suwon-si (KR); Ho Yang, Hwaseong-si (KR); Myounghwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 16/487,965

(22) PCT Filed: Feb. 1, 2018

(86) PCT No.: PCT/KR2018/001382
§ 371 (c)(1),
(2) Date: Aug. 22, 2019

(87) PCT Pub. No.: WO2018/155832
PCT Pub. Date: Aug. 30, 2018

(65) Prior Publication Data
US 2020/0001822 A1    Jan. 2, 2020

(30) Foreign Application Priority Data
Feb. 24, 2017    (KR) .......................... 10-2017-0024860

(51) Int. Cl.
*B60R 25/01*    (2013.01)
*H04W 4/40*    (2018.01)
(Continued)

(52) U.S. Cl.
CPC .............. *B60R 25/01* (2013.01); *B60R 25/10* (2013.01); *H04W 4/40* (2018.02); *H04W 12/06* (2013.01); *H04W 12/63* (2021.01)

(58) Field of Classification Search
CPC ........ B60R 25/01; B60R 25/10; H04W 12/63; H04W 4/40; G07C 2209/63; H04L 9/32
See application file for complete search history.

(56) References Cited

U.S. PATENT DOCUMENTS 8,736,438 B1    5/2014    Vasquez et al.
9,241,235 B2    1/2016    Santavicca
(Continued)

FOREIGN PATENT DOCUMENTS

CN    1964566 A    5/2007
CN    102104435 A    6/2011
(Continued)

OTHER PUBLICATIONS

European Search Report dated Jan. 30, 2020; European Appln. No. 18757476.9-1132 / 3572291 PCT/KR2018001382.
(Continued)

*Primary Examiner* — Vernal U Brown
(74) *Attorney, Agent, or Firm* — Jefferson IP Law, LLP

(57) ABSTRACT

A key authentication method of an apparatus is provided. The key authentication method includes receiving a signal from a terminal using a plurality of communication modules, determining whether the terminal is within a predetermined distance from the apparatus, on the basis of each signal received via the plurality of communication modules, and changing a control mode of a vehicle on which the apparatus is mounted, on the basis of whether the terminal is within the predetermined distance from the apparatus.

15 Claims, 22 Drawing Sheets

(51) Int. Cl.
  *B60R 25/10* (2013.01)
  *H04W 12/06* (2021.01)
  *H04W 12/63* (2021.01)

(56) References Cited

U.S. PATENT DOCUMENTS

| | | |
|---|---|---|
| 2007/0200672 A1 | 8/2007 | Mcbride et al. |
| 2009/0136035 A1 | 5/2009 | Lee |
| 2011/0148573 A1* | 6/2011 | Ghabra ............... B60R 25/245 340/5.61 |
| 2012/0244877 A1 | 9/2012 | Margalef et al. |
| 2015/0147974 A1 | 5/2015 | Tucker et al. |
| 2015/0148989 A1 | 5/2015 | Cooper et al. |
| 2015/0149042 A1 | 5/2015 | Cooper et al. |
| 2016/0016526 A1 | 1/2016 | Louboutin |
| 2016/0063786 A1 | 3/2016 | Lewis et al. |
| 2017/0018128 A1 | 1/2017 | Berezin et al. |

FOREIGN PATENT DOCUMENTS

| | | |
|---|---|---|
| CN | 105398420 A | 3/2016 |
| CN | 105830470 A | 8/2016 |
| DE | 103 17 658 A1 | 11/2004 |
| JP | 2015-228613 A | 12/2015 |
| KR | 10-2007-0049436 A | 5/2007 |
| KR | 10-2009-0019576 A | 2/2009 |
| KR | 10-2014-0065296 A | 5/2014 |
| KR | 10-2016-0088879 A | 7/2016 |

OTHER PUBLICATIONS

Chinese Office Action with English translation dated Jul. 5, 2021; Chinese Appln. No. 201880013809.4.

\* cited by examiner

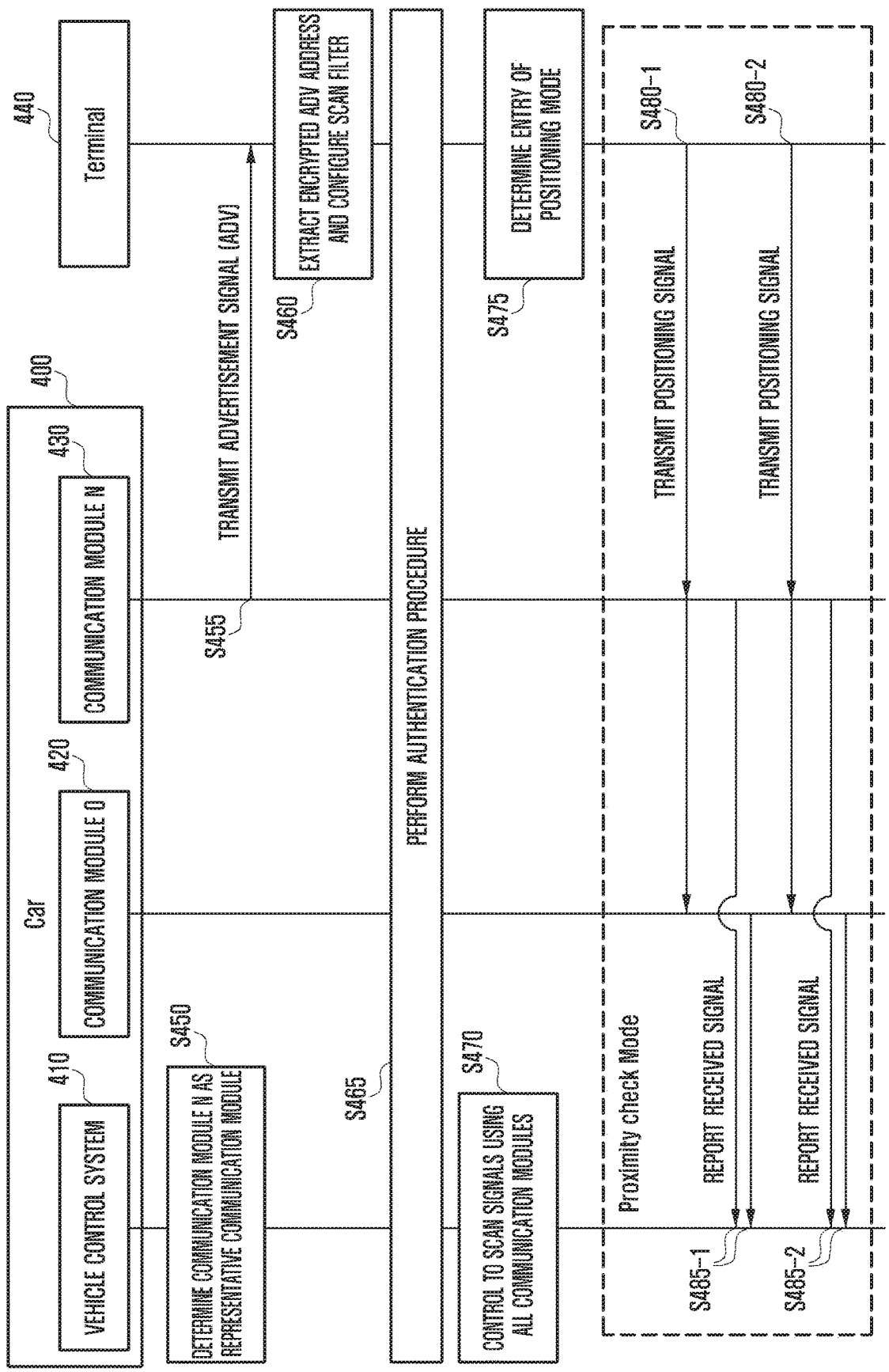

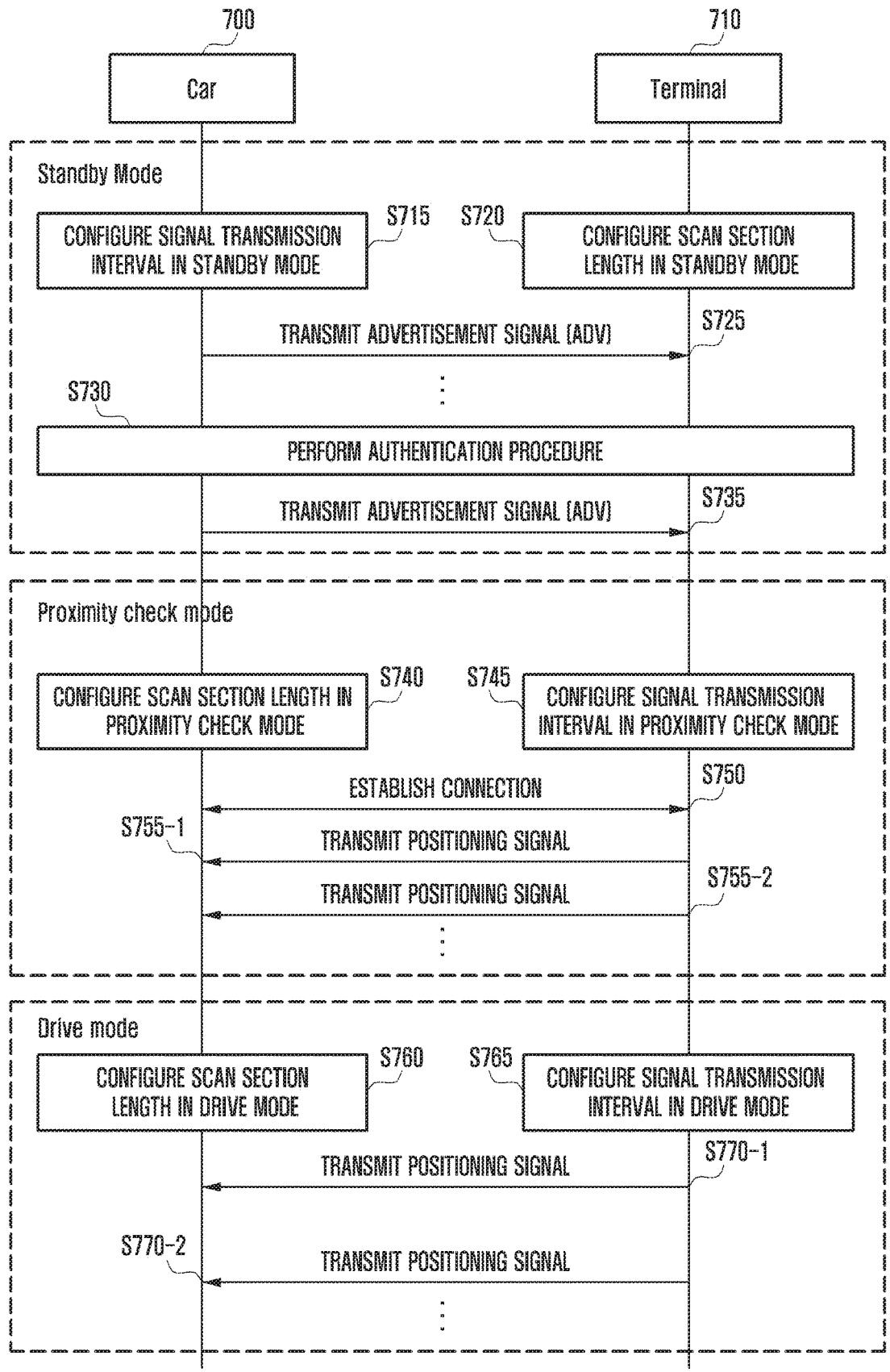

METHOD AND APPARATUS FOR AUTHENTICATING VEHICLE SMART KEY

TECHNICAL FIELD

The disclosure relates to a method and an apparatus for enabling a user to control a vehicle using a terminal as a smart key for the vehicle.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G communication system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched.

Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to 5G communication technologies. As the big data processing technology as described above, a cloud radio access network (cloud RAN) may be applied as an example of convergence of 5G technology and IoT technology.

In general, in order to control open/close of a vehicle door and to start a vehicle, a smart key having predetermined size and volume has been generally used. There have been increasing needs for a user to control various devices, such as a home system, home appliances, or other electronic devices.

Accordingly, the necessity of a technology to use a user's terminal as a smart key for a vehicle has been on the rise.

DISCLOSURE OF INVENTION

Technical Problem

The disclosure has been made in order to solve the above-described problems, and aspects of the disclosure are to provide a method and an apparatus for enabling a user to easily operate a vehicle through mounting of a vehicle smart key function on a user terminal.

Solution to Problem

In an aspect of the disclosure, a key authentication method by a device includes receiving signals from a terminal using a plurality of communication modules; identifying whether the terminal exists within a predetermined distance from the device based on the respective signals received through the plurality of communication modules; and changing a control mode of a vehicle mounted with the device based on whether the terminal exists within the predetermined distance from the device.

In another aspect of the disclosure, a device includes a transceiver configured to transmit and receive signals using a plurality of communication modules; and a controller configured to identify whether a terminal exists within a predetermined distance from the device based on the respective signals received through the plurality of communication modules if the signals are received from the terminal using the plurality of communication modules, and change a control mode of a vehicle mounted with the device based on whether the terminal exists within the predetermined distance from the device.

In still another aspect of the disclosure, a key authentication method by a terminal includes receiving an advertisement signal from a device in a predetermined first period; and transmitting signals in a predetermined second period that is shorter than the predetermined first period if an authentication with the device is completed using the advertisement signal, wherein a control mode of a vehicle mounted with the device is changed if it is determined whether the terminal exists within a predetermined distance from the device by the device including a plurality of communication modules based on the signals transmitted by the terminal.

In yet still another aspect of the disclosure, a terminal includes a transceiver configured to transmit and receive signals using a communication module; and a controller configured to control the transceiver to receive an advertisement signal from a device in a predetermined first period, and to transmit signals in a predetermined second period that is shorter than the predetermined first period if an authentication with the device is completed using the advertisement signal, wherein a control mode of a vehicle mounted with the device is changed if it is determined whether the terminal exists within a predetermined distance from the device by the device including a plurality of communication modules based on the signals transmitted by the terminal.

Advantageous Effects of Invention

According to the aspects of the disclosure, the user can easily operate the vehicle using the terminal carried by the user.

BRIEF DESCRIPTION OF DRAWINGS

FIG. 4 is a sequential diagram illustrating a method in which a vehicle control system authenticates a terminal, receives signals from the terminal using a plurality of communication modules, and determines a distance between the terminal and a vehicle.

FIG. 7 is a sequential diagram illustrating a method for operating a system while minimizing power consumption of a terminal and a vehicle;

MODE FOR THE INVENTION

Figure 1:
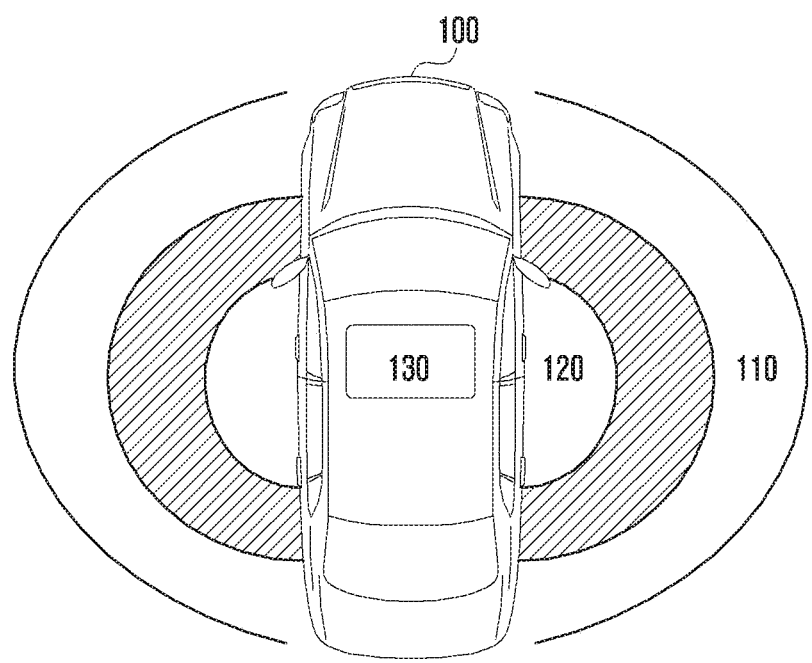
FIG. 1 is a diagram illustrating an embodiment for dividing areas within a predetermined distance from a vehicle.

Hereinafter, the disclosure will be described with reference to the accompanying drawings. The disclosure may have various modifications and several embodiments, and specific embodiments are exemplified in the drawings and related detailed explanations are described. However, the disclosure is not limited to such specific embodiment forms and it should be understood that the disclosure includes all changes and/or equivalents and substitutes included in the spirit and scope of the disclosure. In connection with descriptions of the drawings, similar constituent elements are designated by similar reference numerals.

In the disclosure, the term "include" or "may include" indicates the existence of a disclosed corresponding function, an operation, or a constituent element, and does not limit one or more additional functions, operations, or constituent elements. Further, in the disclosure, the term "include" or "may include" is to designate the existence of the characteristic, number, step, operation, constituent element, component, or a combination thereof, but it should be construed not to pre-exclude the existence of or a possibility of addition of one or more other characteristics, numbers, steps, operations, constituent elements, components, or combinations thereof.

In the disclosure, the expression "or" includes any or all of combinations of words listed together. For example, the expression "A or B" may include A, may include B, or may include both A and B.

The expression "1", "2", "first", or "second" used in the disclosure may modify various constituent elements of the disclosure, but it does not limit the corresponding constituent elements. For example, the above expressions do not limit the sequence and/or importance of the corresponding constituent elements. The expressions may be used to distinguish one component from other components. For example, a first user device and a second user device indicate different user devices although both of them are user devices. For example, without departing from the scope of the disclosure, a first constituent element may be referred to as a second constituent element, and similarly, the second constituent element may also be referred to as the first constituent element.

In the description, if it is described that a certain constituent element is connected or attaches to another constituent element, it may mean that the certain constituent element is directly connected or directly attaches to the other constituent element, or it may mean that an intermediate constituent element exists to connect the above-described constituent elements with each other. In contrast, if it is described that a certain constituent element is directly connected or directly attaches to another constituent element, it may mean that an intermediate constituent element does not exist.

The terms used in the disclosure are used merely to explain specific embodiments, but they are not intended to limit the disclosure. Unless clearly differently meant on the context, singular expressions may include plural expressions.

Unless otherwise defined herein, all terms including technical or scientific terms used herein have the same meanings as commonly understood by those skilled in the art to which the disclosure belongs. It will be further understood that terms, such as those defined in commonly used dictionaries, should be interpreted as having a meaning that is consistent with their meaning in the context of the description and relevant art and should not be interpreted in an idealized or overly formal sense unless clearly defined in the disclosure.

In general, a vehicle may be controlled using a vehicle smart key. For example, in order for a user to open/close a vehicle door or to start the vehicle, the smart key is necessary.

In general, the vehicle smart key is mounted with a module for data communication and a module for positioning. For example, as the module for data communication, an ultrahigh frequency (UHF) communication module performing communication at 100 to 440 MHz may be used. The UHF module may be used for communication for a vehicle, and it may be a non-general communication module.

Further, as the module for positioning, a low frequency (LF) communication module performing communication at 120 to 130 KHz may be used. The size of an antenna is in proportion to a wavelength, and there may be about 20,000 times the difference in wavelength between the LF and Bluetooth low energy (BLE). Further, the LF module is produced by basically winding a cupper line several times, and thus its volume is relatively large. Further, the LF module may be used only for the purpose of measuring a distance, and it may be a non-general communication module.

Recently, researches for a method, in which a user controls a home system, a home appliance, and an electronic device using a terminal, such as a smart phone, that is generally carried by the user, have been actively made. Accordingly, there have been increasing needs for a user to control a vehicle using the terminal. However, it may be physically difficult to mount the UHF module and the LF module used in the above-described general smart key on the smart phone. Because there are limits in reducing the sizes of the UHF module and the LF module, it may be difficult to mount the UHF module and the LF module on the smart phone being generally used. Further, even if the UHF module and the LF module are mounted on the smart phone through an increase of the volume of the smart phone, the smart phone may cause additional power consumption and heating.

A method capable of implementing a smart key using a user terminal such as a smart phone according to the present disclosure will be described.

First, FIG. 1 is a diagram illustrating an embodiment for dividing areas within a predetermined distance from a vehicle.

If a user does not exist within a predetermined distance from a vehicle 100, it is necessary to maintain the vehicle 100 in a state where a vehicle door is unable to be opened or closed and in a state where the vehicle is unable to be started.

If the user exists within the predetermined distance from the vehicle 100, the vehicle 100 and a user terminal may transmit and receive signals with each other to measure a distance between the vehicle 100 and a user. Further, in accordance with the result of the signal transmission and reception, the state of the vehicle 100 may be controlled.

For example, if the user is farther apart from the vehicle 100 than a first area 110 of FIG. 1, the vehicle 100 may be maintained in a state where a vehicle door is unable to be opened or closed or in a state where the vehicle 100 is unable to be started. The first area 110 may correspond to a distance of about 8 m from the vehicle 100.

If the user exists within the first area 110, the vehicle 100 may enter a proximity check mode to identify the distance from the user more accurately.

If the user approaches the vehicle 100 while the proximity check mode is maintained, and then the user exists in a second area 120 of FIG. 1, the vehicle 100 may be switched to a state where the vehicle door is able to be opened or closed. For example, the second area 120 may correspond to a distance within 1 m from the vehicle 100. If the user terminal is detected within the second area 120 from the vehicle 100, the door of the vehicle 100 is unlocked, and the vehicle 100 may be switched to a state where the user can open the door using the carried terminal.

Further, if the user exists inside the vehicle 100 that corresponds to a third area 130 of FIG. 1, the vehicle 100 may be switched to a state where the vehicle is unable to be started. Further, using terminal information existing in the third area 130, the user may change the vehicle state, such as vehicle chair or handle location, to a predetermined state.

Hereinafter, a method for determining whether the user terminal exists within a predetermined distance from the vehicle 100 will be described in detail. For example, as described above with reference to FIG. 1, a method for detecting the existence of the user terminal within the first area 110 and detecting the existence of the user terminal within the second area 120 will be described in detail.

Figure 2:
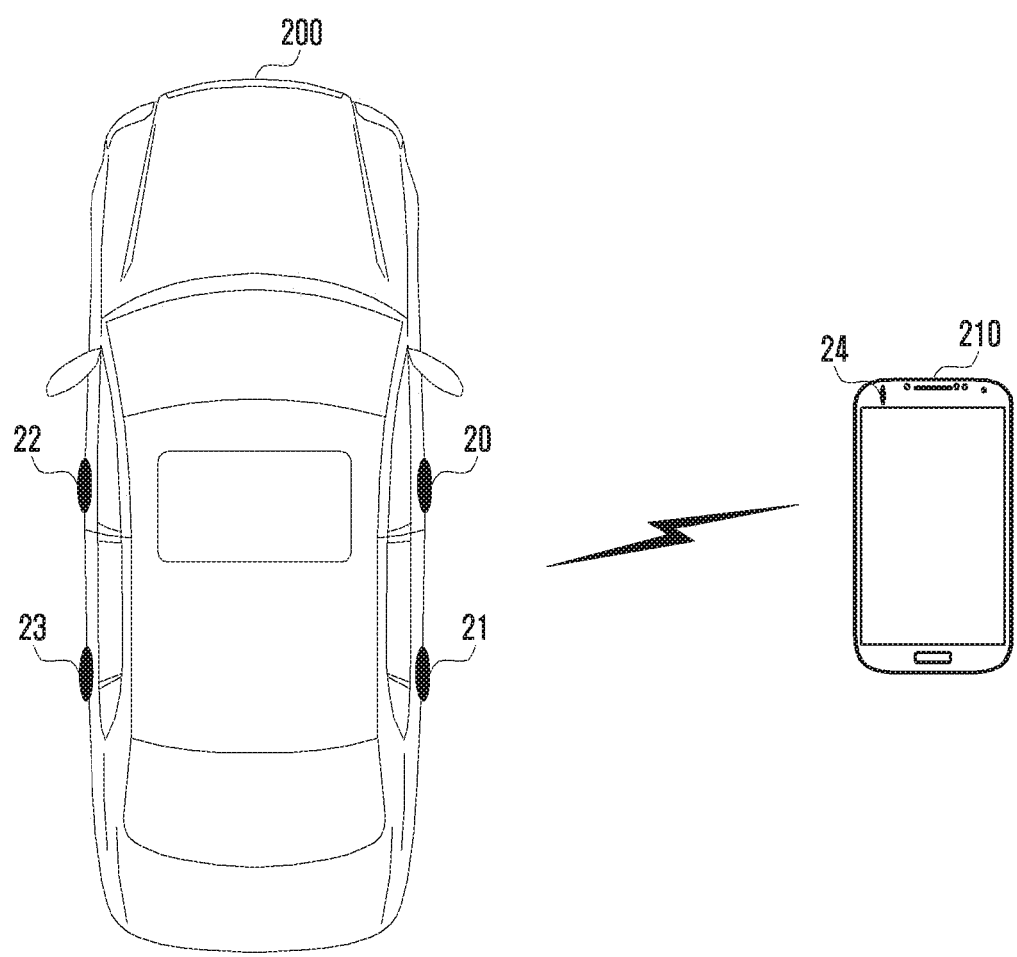
FIG. 2 is a diagram illustrating a vehicle including communication modules and a terminal to transmit and receive signals using the communication modules.

FIG. 2 is a diagram illustrating a vehicle including communication modules and a terminal to transmit and receive signals using the communication modules.

According to an embodiment of the disclosure, a plurality of communication modules 20, 21, 22, and 23 may be mounted on a vehicle 200. Although FIG. 2 illustrates an embodiment in which two communication modules are mounted on each of both side surfaces, this is merely exemplary, and the mount locations and the number of mounts of the plurality of communication modules 20, 21, 22, and 23 are not limited. For example, the communication modules may be mounted on front, rear, and side surfaces, and upper and lower portions of the vehicle.

Further, although not illustrated in FIG. 2, a separate device or system may be mounted on the vehicle 200, which controls to transmit and receive signals using the plurality of communication modules 20, 21, 22, and 23, collects information on the transmitted and received signals, and measures the distance between the vehicle 100 and the terminal.

The above-described device may control to transmit a beacon signal using the plurality of communication modules 20, 21, 22, and 23. Hereinafter, the beacon signal may be interchangeably used with an advertisement signal (advertisement signal).

Further, the device may control to receive a signal transmitted from another external terminal using the plurality of communication modules 20, 21, 22, and 23. The device may determine the location of the external terminal using the strength of the signal transmitted by the other external terminal, which is measured by the plurality of communication modules 20, 21, 22, and 23. Further, the device may control the vehicle 200 based on the determination result of the terminal location. For example, the device may calculate the terminal location using a signal vector for the received signal.

Although FIG. 2 illustrates that a smart phone performs a smart key function to control the vehicle 200, a smart phone, a tablet PC, a notebook PC, and various wearable devices, such as a smart watch and smart glasses, may be used as the terminal 210 that transmits and receives signals with the vehicle 200.

In general, the terminal 210 may include one communication module 24. However, this is merely exemplary, and the number of communication modules 24 that can be mounted on the terminal 210 is not limited.

The terminal 210 may receive beacon signals transmitted by the plurality of communication modules 20, 21, 22, and 23 of the vehicle 200. Further, the terminal 210 may transmit the signal using the communication module 24.

Based on the signal transmitted through the communication module 24, the vehicle 200 may predict the distance between the vehicle 200 and the terminal 210.

On the other hand, although the plurality of communication modules 20, 21, 22, and 23 of the vehicle 200 and the communication module 24 of the terminal 210 may be LBE modules, this is merely exemplary, and various types of communication modules that can be used for near field communication may be used.

Specifically, a method for transmitting and receiving signals between communication modules mounted on a vehicle and a terminal will be described based on flowcharts of FIGS. 3A to 3C.

Figure 3A:
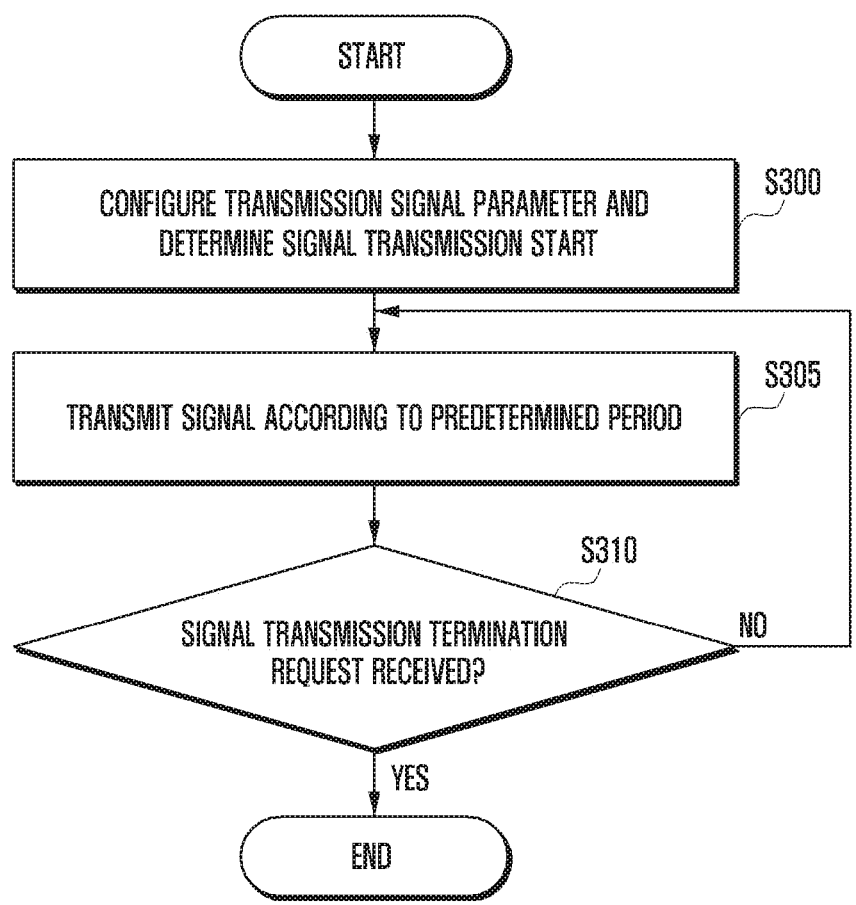
FIG. 3A is a flowchart illustrating a method for transmitting and receiving signals between communication modules mounted on a vehicle and a terminal.
Figure 3B:
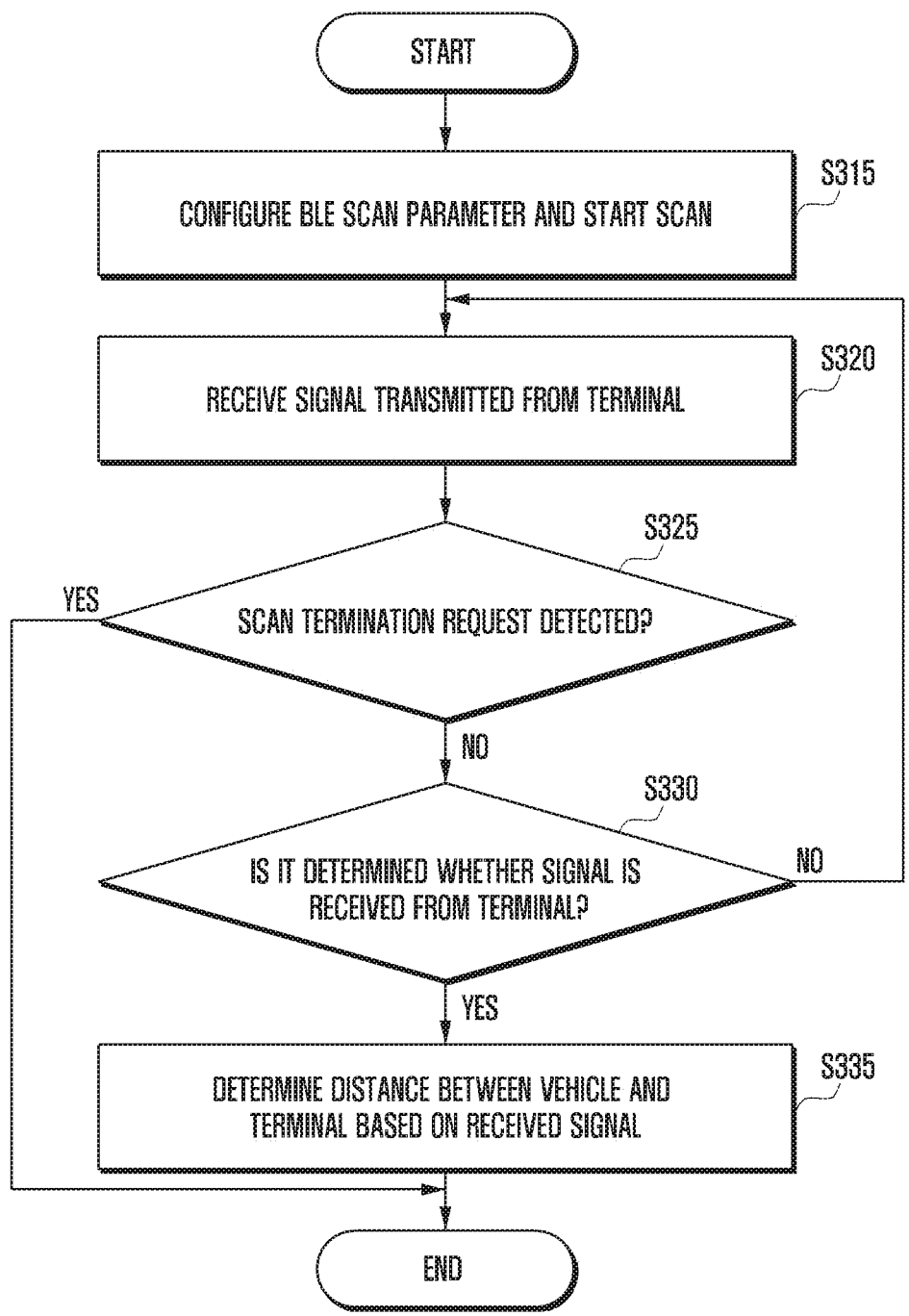
FIG. 3B is a flowchart illustrating a method for transmitting and receiving signals between communication modules mounted on a vehicle and a terminal.

First, as illustrated in FIG. 3A, at operation S300, the terminal may configure a transmission signal parameter and it may determine start of signal transmission. For example, the terminal may receive a beacon signal from at least one communication module mounted on the vehicle. Further, the terminal having received the beacon signal may start the signal transmission.

Specifically, a device mounted on the vehicle may control to transmit the beacon signal in a predetermined period using at least one communication module. The device may transmit the beacon signal using all of a plurality of communication modules. However, because it is not detected that the terminal exists at a distance that is relatively close to the vehicle, the device may transmit the beacon signal using only one communication module in order to minimize power consumption.

If the terminal receives the beacon signal, the terminal may determine that it becomes close to the vehicle enough to receive the beacon signal. Accordingly, the terminal may start the signal transmission. In this case, the signal transmitted by the terminal may be a signal for the device mounted on the vehicle to measure the distance between the terminal and the vehicle. Hereinafter, the signal transmitted by the terminal having received the beacon signal is called a positioning signal.

At operation S305, the terminal may transmit the positioning signal in accordance with the predetermined period. In this case, the positioning signal may include at least one of a signal discrimination field based on an authenticated smart key identifier, a terminal manufacturer, signal transmission power information, or terminal state information. For example, the positioning signal may include various pieces of information whereby the device mounted on the vehicle can identify whether the terminal is an authenticated terminal with respect to the vehicle.

At operation S310, if it is determined that a signal transmission termination request is received, the terminal may stop the transmission of the positioning signal. For example, if a user command for stopping the transmission of the positioning signal is input through the terminal, the terminal may stop the transmission of the positioning signal.

On the other hand, the device mounted on the vehicle may start BLE scan parameter configuration and scan at operation S315. Specifically, if it is determined to receive the beacon signal transmitted by the terminal using at least one communication module, the device may configure the BLE scan parameter and it may start the scan. For example, the device may determine the time to perform the LBE scan. Further, if only one communication module for transmitting the beacon signal is turned on, the device may turn on the power of the plurality of communication modules for the BLE scan.

At operation S320, the device may receive the signal transmitted from the terminal. Further, at operation S325, if the scan termination request is detected, the device may stop the LBE scan. For example, at operation S315, if a user request for stopping the BLE scan is input even before a time for performing the configured BLE scan arrives, the device may stop the LBE scan.

Further, at operation S330, the device may determine whether the positioning signal has been received from the terminal. Further, at operation S335, the device may determine the distance between the vehicle and the terminal based on the received signal.

Specifically, the device may receive the positioning signal transmitted by the terminal using the plurality of communication modules mounted on various locations of the vehicle. Accordingly, the device may identify the reception powers of the positioning signals received through the respective communication modules. For example, in accordance with the location at which the terminal approaches the vehicle, the reception powers of the positioning signals received through the respective communication modules may differ. Further, the device may identify the reception angle of the positioning signals received through the respective communication modules.

The device may determine the distance between the vehicle and the terminal based on information on the reception powers of the positioning signals received through the respective communication modules and information on the reception angle. As described above with reference to FIG. 1, the device may determine whether the terminal exists in an area within a predetermined distance from the vehicle rather than determining an absolute distance between the vehicle and the terminal.

Figure 3C:
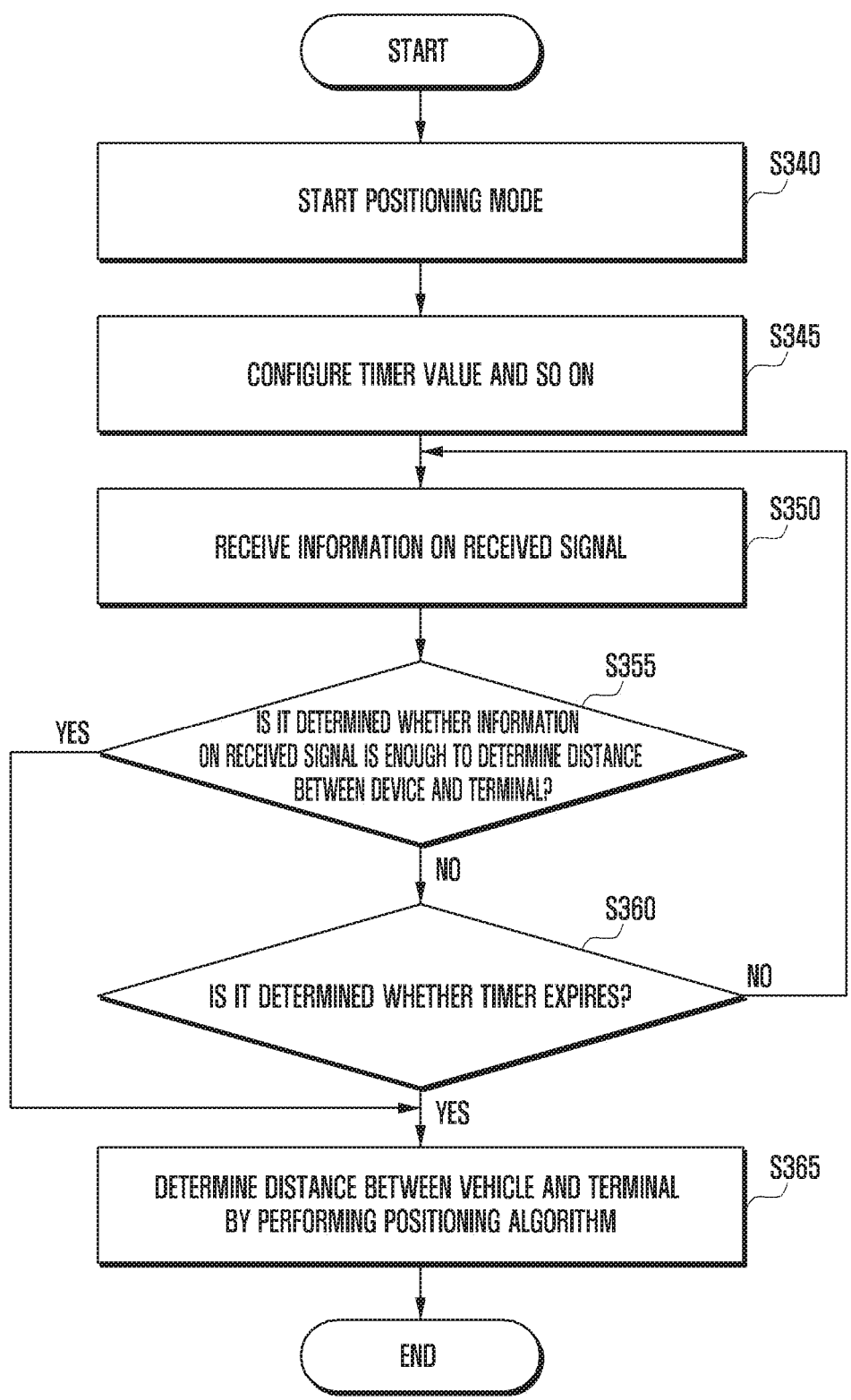
FIG. 3C is a flowchart illustrating a method for transmitting and receiving signals between communication modules mounted on a vehicle and a terminal.

FIG. 3C is a flowchart illustrating a detailed method for determining the distance between the vehicle and the terminal.

First, at operation S340, the device may start a positioning mode. The positioning mode may be a mode for determining the distance between the vehicle and the terminal.

Further, at operation S345, the device may configure a timer value and the like. For example, if the reception period of the positioning signal received from the terminal is too long, or the reception of the signal is stopped over a threshold time during reception of the positioning signal, it may not be a normal approach of a user. Accordingly, the device may configure the timer value, and it may determine the distance between the vehicle and the terminal using the positioning signal of the terminal received for the predetermined time.

At operation S350, the device may receive information on the received signal. For example, the device may receive, from the plurality of communication modules, information on the reception powers and the reception angles of the received signals received through the plurality of communication modules.

Further, at operation S355, the device may determine whether the information on the received signal is enough to determine the distance between the device and the terminal. If it is not enough to determine the distance between the device and the terminal using the information on the received signal received by the device, the device, at operation S360, may determine whether a timer has expired. Accordingly, the device may continuously receive the information on the received signal until the timer expiration.

Meanwhile, if it is determined that it is enough to determine the distance between the device and the terminal using the information on the received signal received by the device, the device, at operation S365, may determine the distance between the vehicle and the terminal by performing the positioning algorithm even before the timer expiration.

The device may be mounted inside the vehicle, but this is merely exemplary, and the device may exist outside the vehicle. Further, the device may be a separate server, and it may receive information on the positioning signal received by the plurality of communication modules, and it may determine the distance between the vehicle and the terminal based on the received information. Further, the separate server may transmit a control signal of the vehicle to the vehicle based on the result of the determination.

FIG. 4 is a sequential diagram illustrating in detail a method in which a vehicle control system authenticates a terminal, receives signals from the terminal using a plurality of communication modules, and determines a distance between the terminal and a vehicle according to an embodiment of the disclosure.

A vehicle 400 may include a vehicle control system 410 and N communication modules 420 and 430. The vehicle control system 410 may be the above-described device mounted on the vehicle.

The terminal 440 may be an initially registered terminal to control the vehicle 400. For example, when the vehicle 400 is initially purchased, a user may register to perform a smart key function using the user's terminal 400.

At operation S450, the vehicle control system 410 may determine communication module N 430 as a representative communication module. The vehicle control system 410 may control to transmit an advertisement signal using the communication module N 430 that is determined as the representative communication module. The advertisement signal (adv) may be a beacon signal transmitted in the predetermined period as described above.

At operation S450, because it is not detected that the terminal exists at a distance that is relatively close to the vehicle, the vehicle control system 410 may control to transmit the advertisement signal (adv) through the representative communication module only in order to minimize power consumption.

The vehicle control system 410 may change the representative communication module in a predetermined period. Further, the vehicle control system 410 may randomly determine the representative communication module.

At operation S455, the communication module N 430 may transmit the advertisement signal (adv) in accordance with the predetermined period. Further, at operation S460, the terminal 440 may extract an encrypted adv. Address and it may configure a scan filter.

Specifically, if the terminal 440 registered to control the vehicle 400 exists within a distance in which the terminal 440 can receive the beacon signal, the terminal 440 may receive the advertisement signal (adv) transmitted by the communication module N 430. The beacon signal is a signal that can be transmitted up to devices within maximally 100 m, and thus the terminal 440 may receive the advertisement signal (adv) from a relatively long distance.

The terminal 440 may have information on the registered vehicle 400. Accordingly, the terminal 440 may extract an address with respect to the advertisement signal (adv) received from the registered vehicle 400. In this case, the terminal 440 may extract the address in the case where the advertisement signal (adv) with a predetermined strength or more is received.

At operation S465, the vehicle 400 and the terminal 440 may perform an authentication procedure. Further, the vehicle control system 410 and the terminal may extract encrypted advertisement addresses, and they may configure a scan filter. Because the address is not directly transferred through a message, but it is encrypted to be transferred, a plurality of addresses may be used.

Meanwhile, at operation S470, the vehicle control system 410 may control to scan signals using all communication modules. Further, at operation S475, the terminal 440 may determine entry of a positioning mode. For example, if the advertisement signal (adv) with a predetermined strength or more is received, the terminal 440 may enter the positioning mode.

Accordingly, at operations S480-1 and S480-2, the terminal 440 may transmit the positioning signal. The terminal 440 may transmit the positioning signal using a BLE module in accordance with the predetermined period.

The positioning signal transmitted by the terminal 440 may be received through the plurality of communication modules 420 and 430 mounted on the vehicle 400. However, the positioning signals received by the plurality of communication modules 420 and 430 may have different reception powers and different reception angles in accordance with the location of the terminal 440 and the distance between the vehicle 400 and the terminal 440.

Further, at operations S485-1 and S485-2, the plurality of communication modules 420 and 430 mounted on the vehicle 400 may report received signals to the vehicle control system 410, respectively. Specifically, each of the plurality of communication modules 420 and 430 may transmit information on the reception power and the reception angle of the received positioning signal to the vehicle control system 410.

A mode in which the terminal 440 transmits the positioning signal and the vehicle 400 receives the positioning signal transmitted by the terminal 440 using the plurality of communication modules may be a proximity check mode.

In the method as described above with reference to FIG. 4, the vehicle control system 410 may determine whether the terminal 440 exists within a certain distance from the vehicle 400. Further, the vehicle control system 410 may control the vehicle 400 based on the result of the determination.

For example, if it is determined that the terminal 440 does not exist within a first distance (e.g., 8 m) from the vehicle 400, the vehicle control system 410 may maintain a state where the door of the vehicle 400 is unable to be opened or closed and a state where the vehicle is unable to be started.

Further, if it is determined that the terminal 440 approaches the first distance from the vehicle 400, the vehicle 400 and the terminal 440 may enter the proximity check mode.

In the proximity check mode, if the vehicle 400 determines that the terminal 440 exists within a second distance (e.g., 1 m) from the vehicle 400 using the positioning signal transmitted by the terminal 440, the vehicle control system 410 may be switched to a state where the door of the vehicle 400 is able to be opened or closed.

Further, if the terminal 440 exists inside the vehicle 400, the vehicle control system 410 may be switched to a state where the vehicle 400 is able to be started. Further, based on the information of the terminal 440 existing inside the vehicle 400, the vehicle control system 410 may change the vehicle state, such as a vehicle chair or a handle location, as preconfigured by the user.

Figure 5:
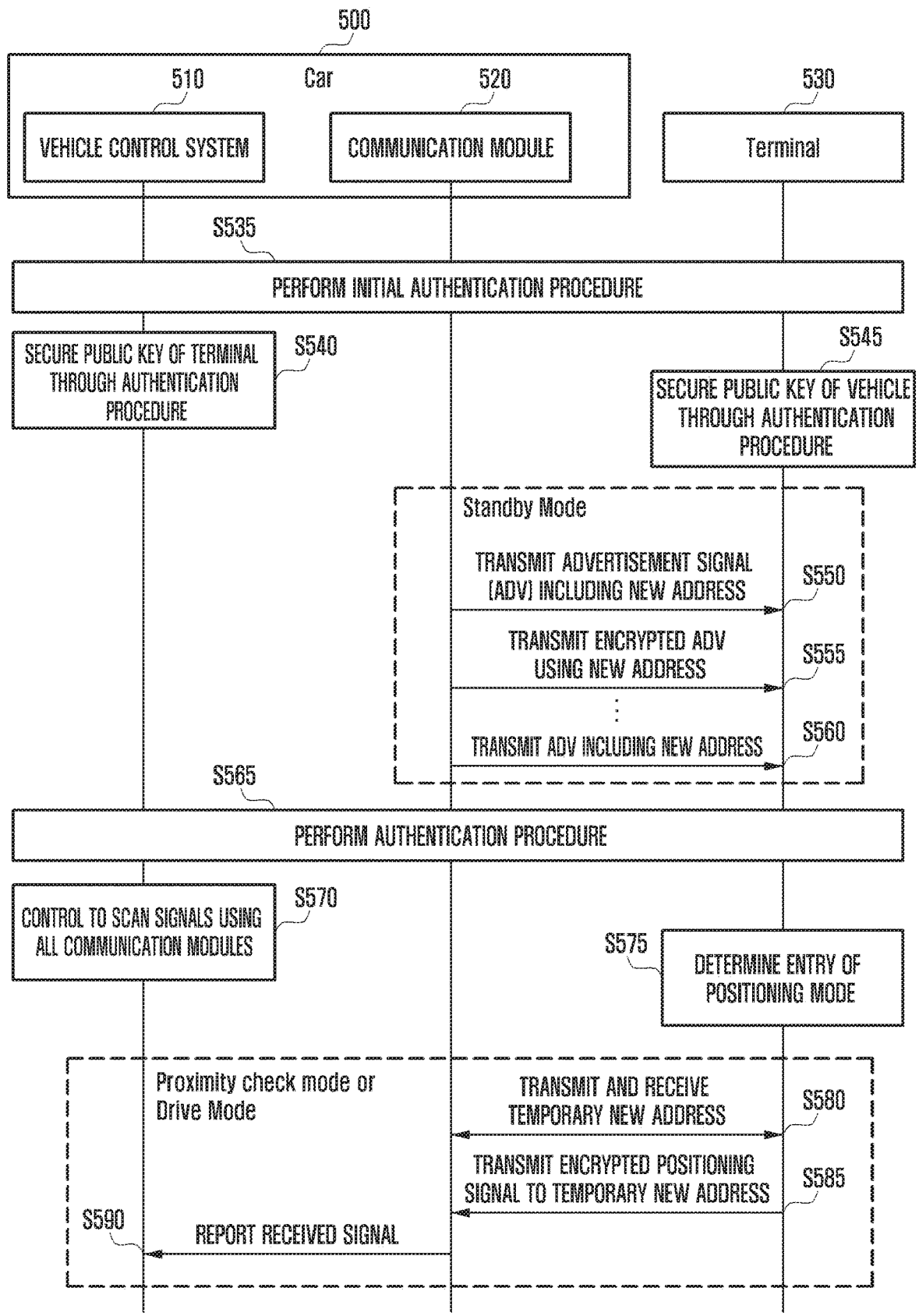
FIG. 5 is a sequential diagram illustrating a method in which a vehicle control system authenticates a terminal, receives signals from the terminal using a plurality of communication modules, and determines a distance between the terminal and a vehicle, according to various embodiments of the disclosure.

FIG. 5 is a sequential diagram illustrating a method in which a vehicle control system authenticates a terminal, receives signals from the terminal using a plurality of communication modules, and determines a distance between the terminal and a vehicle according to another embodiment of the disclosure.

A vehicle 500 illustrated in FIG. 5 may include a vehicle control system 510 and a communication module 520. Although FIG. 5 illustrates only one communication module 520, the vehicle 500 may include a plurality of communication modules as described above.

The vehicle control system 510 may be a device mounted on the vehicle as described above.

At operation S535, the vehicle 500 and the terminal 530 may perform initial authentication procedure. For example, the initial authentication procedure may be a procedure in which the terminal 530 performs initial registration so as to control the vehicle 500. For example, when initially purchasing the vehicle 500, the user may perform the initial authentication procedure through registration of a smart key function using the user terminal 530.

At operation S540, the vehicle control system 510 may secure a public key of the terminal through an authentication procedure. Further, at operation S545, the terminal 530 may secure a public key of the vehicle through an authentication procedure. The respective public keys may be used when encrypting the signal to be transmitted.

After the initial authentication procedure, the vehicle control system 510 of the vehicle 500 having entered a standby mode, at operation S550, may transmit an advertisement signal including a new address using the communication module 520. The communication module 520 may be any one of the plurality of communication modules.

For example, the vehicle control system 510 may encrypt the advertisement signal (adv) using a nominal address that is an address publicly known between the vehicle 500 and the terminal 530.

Further, the vehicle control system 510 may encrypt and transmit the new address used in the standby mode together with the advertisement signal (adv). For example, the vehicle control system 510 may encrypt and transmit a standby address being used in the standby mode using a private key of the vehicle 500. The private key of the vehicle may be interpreted using the public key of the vehicle.

Accordingly, because the terminal 530 having performed the initial authentication procedure secures the public key of the vehicle, it may decrypt the standby address encrypted using the private key of the vehicle.

At operation S555, the vehicle control system 510 may transmit the advertisement signal (adv) encrypted using the new address using the communication module 520. For example, the vehicle control system 510 may encrypt the advertisement signal (adv) using the standby address, and it may transmit the encrypted advertisement signal (adv). Through decryption of the encrypted standby address, the terminal 530 may decrypt the encrypted advertisement signal (adv) using the standby address.

By the above-described method, the vehicle 500 and the terminal 530 may take precautions against forgery of a signal packet wirelessly transmitted in the standby mode.

At operation S565, an authentication procedure between the vehicle 500 and the terminal 530 may be performed. Further, at operation S570, the vehicle control system 510 may control to scan signals using all the communication modules. Further, at operation S575, the terminal 530 may determine entry of the positioning mode.

Accordingly, at operation S580, the vehicle 500 and the terminal 530 may transmit and receive temporary new addresses while establishing a connection to each other. Through the connection establishment, the vehicle 500 and the terminal 530 can stably change the addresses.

Specifically, the vehicle 500 and the terminal 530 may share a temporary key being used in the proximity check mode. For example, the terminal 530 may transmit a new address using the private key of the terminal 530.

At operation S585, the terminal 530 may transmit the encrypted positioning signal to the temporary new address. For example, the terminal 530 may transmit the encrypted positioning signal to the temporary new address using the BLE module.

Further, at operation S590, the communication module 520 mounted on the vehicle 500 may report the received signal to the vehicle control system 510. A plurality of communication modules 520 may be mounted on the vehicle 500. Further, the communication module 520 may transmit information on the reception power and the reception angle of the received positioning signal to the vehicle control system 510.

A mode in which the terminal 530 transmits the positioning signal and the vehicle 500 receives the positioning signal transmitted by the terminal 530 using the plurality of communication modules may be a proximity check mode.

Although FIG. 5 illustrates the operations S50 to S590 only once, this is merely exemplary, the operations S50 to S590 may be repeated until the vehicle control system 510 can sufficiently determine the distance between the vehicle 500 and the terminal 530 or until a timer expires.

By the method as described above with reference to FIG. 5, the vehicle control system 510 may determine in what distance from the vehicle 500 the terminal 530 exists. Further, the vehicle control system 510 may control the vehicle 500 based on the result of the determination.

For example, if it is determined that the terminal 530 does not exist within the first distance (e.g., 8 m) from the vehicle 500, the vehicle control system 510 may maintain a state where the door of the vehicle 500 is unable to be opened or closed and a state where the vehicle 500 is unable to be started.

Further, if it is determined that the terminal 530 gradually approaches the vehicle 500 and the terminal 530 exists within the second distance (e.g., 1 m) from the vehicle 500, the vehicle control system 510 may be switched to the state where the door of the vehicle 500 is able to be opened or closed.

Further, if the terminal 530 exists inside the vehicle 500, the vehicle control system 510 may be switched to a state where the vehicle 400 is able to be started. Further, based on information of the terminal 530 existing inside the vehicle 500, the vehicle control system 510 may change the vehicle state, such as a vehicle chair or a handle location, as preconfigured by the user.

Figure 6:
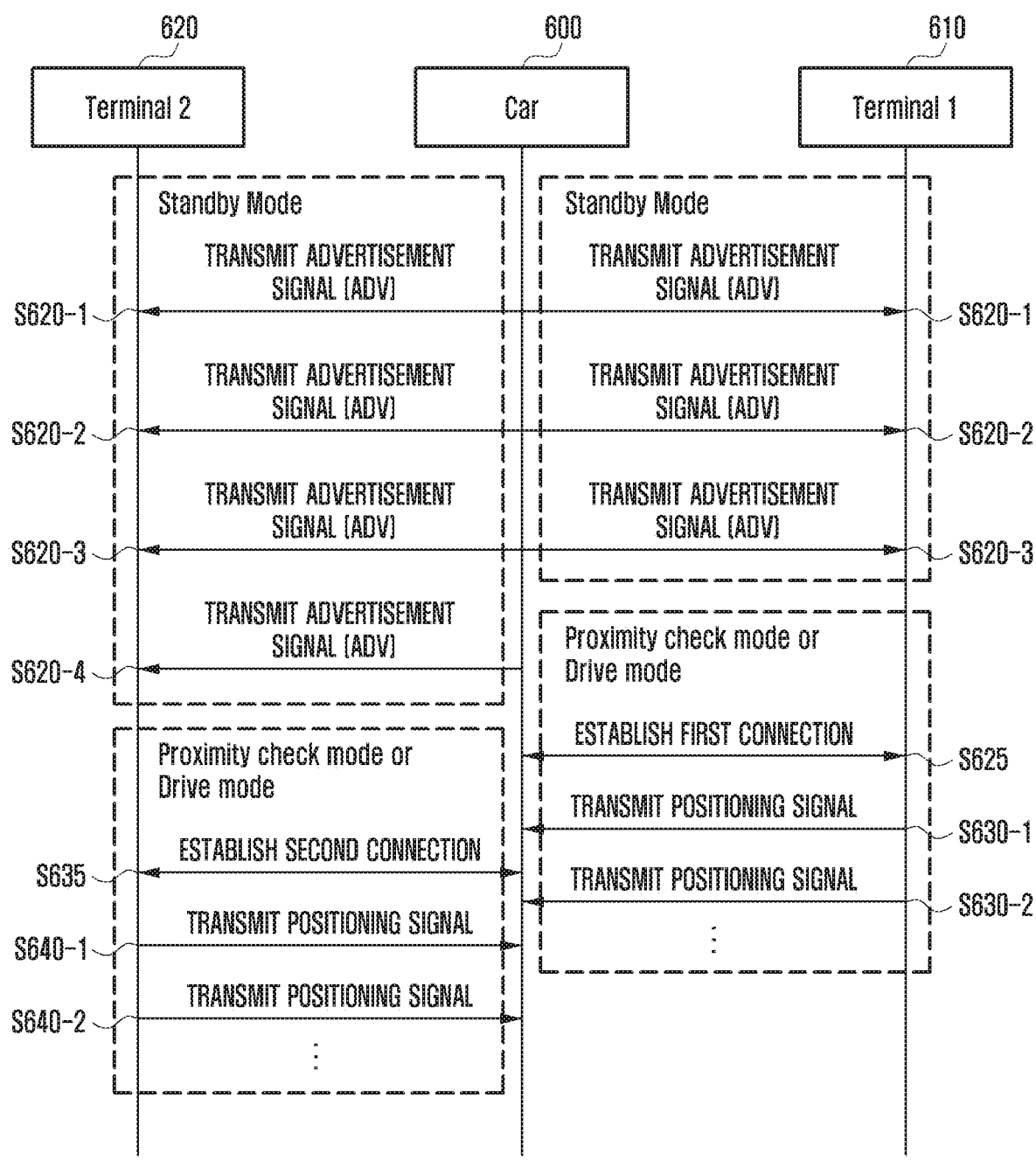
FIG. 6 is a diagram illustrating a method in which a vehicle control system authenticates a plurality of terminals, receives signals from the plurality of terminals using a plurality of communication modules, and determines distances between the plurality of terminals and a vehicle according to another embodiment of the disclosure.

FIG. 6 is a diagram illustrating a method in which a vehicle control system authenticates a plurality of terminals, receives signals from the plurality of terminals using a plurality of communication modules, and determines distances between the plurality of terminals and a vehicle according to another embodiment of the disclosure.

If several users use one vehicle 600, or one user possesses and uses a plurality of terminals, it is required to control the vehicle 600 using the respective terminals.

Accordingly, the vehicle 600 may discriminate the plurality of terminals through generation of different proximity addresses for keys being transmitted. For example, the vehicle 600 may generate different proximity addresses using random generation.

At operations S620-1 to S620-4, after the initial authentication procedure, the vehicle 600 having entered a standby mode may transmit an advertisement signal. The advertisement signal may be a beacon signal that can be received by all terminals existing within a predetermined distance from the vehicle 600. Accordingly, the advertisement signal that the vehicle 600 transmits using at least one communication module may be received by a first terminal 610 and a second terminal 620.

As described above with reference to FIG. 5, the advertisement signal may include a new address. For example, the vehicle 600 may encrypt the advertisement signal (adv) using a nominal address that is an address publicly known between the vehicle 600 and the terminals 610 and 620.

Further, the vehicle 600 may encrypt and transmit the new address being used in the standby mode together with the advertisement signal (adv). For example, the vehicle 600 may encrypt and transmit a standby address being used in the standby mode using a private key of the vehicle 600. The private key of the vehicle may be interpreted using the public key of the vehicle.

Accordingly, because the terminals 610 and 620 having performed the initial authentication procedure secure the public key of the vehicle 600, they may decrypt the standby address encrypted using the private key of the vehicle 600.

The first terminal 610 and the second terminal 620 may receive different advertisement signals in accordance with the distance from the vehicle 600 or the communication state. For example, as illustrated in FIG. 6, the first terminal 610 may receive the advertisement signal transmitted at operation S620-3, and it may enter the proximity check mode or drive mode through the authentication procedure.

If the second terminal 620 is farther apart from the vehicle 600 than the first terminal 610, or it is in a bad communication state, the second terminal 620 may receive the advertisement signal transmitted at operation S620-4, and it may enter the proximity check mode or drive mode through the authentication procedure.

At operation S625, the vehicle 600 and the first terminal 610 may establish a first connection. In this case, the vehicle 600 and the first terminal 610 may transmit and receive temporary new addresses while establishing the connection. Through the connection establishment, the vehicle 600 and the terminal 610 can stably change the addresses.

Specifically, the vehicle 600 and the first terminal 610 may share a temporary key being used in the proximity check mode or the drive mode. For example, the first terminal 610 may transmit a new address using the private key of the first terminal 610.

At operations S630-1 and S630-2, the first terminal 610 may transmit the encrypted positioning signal to the temporary new address. For example, the first terminal 610 may transmit the encrypted positioning signal to the temporary new address using the BLE module.

Meanwhile, at operation S635, the vehicle 600 and the second terminal 620 may establish a second connection. In this case, the vehicle 600 and the second terminal 620 may transmit and receive temporary new addresses while establishing the connection. Through the connection establishment, the vehicle 600 and the second terminal 620 can stably change the addresses.

The vehicle 600 and the second terminal 620 may share a temporary key being used in the proximity check mode or the drive mode. For example, the second terminal 620 may transmit a new address using the private key of the second terminal 620. In this case, the second terminal 620 may generate a new address that is different from the new address generated by the first terminal 610. For example, through the random generation, the second terminal 620 may generate the new address that is different from the new address generated by the first terminal 610.

Further, at operations S640-1 and S640-2, the second terminal 620 may transmit the encrypted positioning signal to the temporary new address. For example, the second terminal 620 may transmit the encrypted positioning signal to the temporary new address using the BLE module.

The detailed contents, in which the vehicle 600 determines the locations of the first terminal 610 and the second terminal 620 using the plurality of communication modules, are as described above.

FIG. 7 is a sequential diagram illustrating a method for operating a system while minimizing power consumption of a terminal and a vehicle.

A vehicle 700 of FIG. 7 may receive a positioning signal transmitted by the terminal 710 using a plurality of communication modules as described above.

The vehicle 700 and the terminal 710 having performed an initial authentication procedure may enter a standby mode. At operation S715, the vehicle 700 may configure a signal transmission interval in the standby mode. Further, at operation S720, the terminal 710 may configure a scan section length in the standby mode.

Specifically, the vehicle 700 may transmit an advertisement signal (adv) in the standby mode. Accordingly, at operation S715, the vehicle 700 may determine the transmission interval of the advertisement signal.

In the standby mode, if the terminal detects the advertisement signal even if the terminal 710 is relatively far apart from the vehicle 700, it is possible to immediately enter the authentication procedure, and thus it is not necessary for the vehicle 700 to frequently transmit the advertisement signal.

Accordingly, if it is assumed that the vehicle 700 operates the signal transmission period as a long period mode and a short period mode, the vehicle 700, in the standby mode, may determine to transmit the advertisement signal in the long period mode. Because the vehicle 700 transmits the advertisement signal in accordance with the relatively long period, the vehicle 700 can minimize power consumption. For example, although FIG. 7 illustrates that the vehicle 700 transmits the advertisement signal only once at operation S725, the vehicle 700 may repeatedly transmit the advertisement signal in accordance with the configured long period.

On the other hand, in order to minimize the power consumption in the standby mode, the terminal 710 may configure a half scan mode.

If the terminal 710 receives the advertisement signal transmitted by the vehicle 700, the vehicle 700 and the terminal 710, at operation S730, may perform the authentication procedure. For example, if the terminal 710 receives the advertisement signal that the vehicle 700 transmits with a received signal strength indicator (RSSI) value that is equal to or higher than a threshold value, the terminal 710 may perform the authentication procedure with the vehicle 700.

Further, even after the authentication procedure is completed, the vehicle 700, at operation S735, may continuously transmit the advertisement signal.

Meanwhile, once entering the proximity check mode, the vehicle 700, at operation S740, may configure the scan section length in the proximity check mode. Further, at operation S745, the terminal 710 may configure the signal transmission interval in the proximity check mode.

The proximity check mode is a mode in which it is determined how long the terminal 710 is apart from the vehicle 700 through reception of the positioning signal transmitted by the terminal 710 using the plurality of communication modules, such as the BLE modules, mounted on the vehicle 700. Accordingly, it is necessary for the vehicle 700 to repeatedly receive the positioning signal plural times from the terminal 710 and to measure an accurate location of the terminal 710 rather than to minimize the power consumption. Accordingly, at operation S740, the vehicle 700 may configure a full scan mode in the proximity check mode.

Further, in the proximity check mode, the terminal 710 may configure a relatively short signal transmission interval through an operation in the short period mode. For example, the terminal 710 may configure the positioning signal transmission interval to 100 ms.

Accordingly, at operation S750, the vehicle 700 and the terminal 710 may establish a connection with each other. Further, at operations S755-1 and S755-2, the terminal 710 may transmit the positioning signal in accordance with the configured positioning signal transmission interval.

If it is determined that the terminal 710 is quite adjacent (e.g., within 1 m) to the vehicle 700 according to the result of the positioning signal reception, the vehicle 700 may be switched to a state where the vehicle door is able to be opened or closed by the terminal 710.

Further, in accordance with the state switching of the vehicle 700, the terminal 710 may display a user interface (UI) screen indicating that the vehicle door is able to be opened or closed. If a command for opening the door of the vehicle 700 is input from a user, the terminal 710 may transmit the received user command to the vehicle 700. Further, the vehicle 700 may unlock the vehicle door in accordance with the received user command.

If it is determined that the vehicle door is unlocked and the terminal 710 exists inside the vehicle 700, the vehicle 700 and the terminal 710 may enter the drive mode.

At operation S760, the vehicle 700 may configure the scan section length in the drive mode. Further, at operation S765, the terminal 710 may configure the signal transmission interval in the drive mode.

The drive mode is a mode in which it is identified that the terminal 710 exists inside the vehicle 700, and thus it is not necessary for the vehicle 700 to concretely identify the location of the terminal 710. For example, it is necessary for the vehicle 700 to identify whether the terminal 710 continuously exists inside the vehicle 700 only.

Accordingly, the vehicle 700 may configure the half scan mode in the drive mode. Further, the terminal 710 may also configure the relatively long signal transmission interval through an operation in the long period mode in the drive mode.

As described above with reference to FIG. 7, the vehicle and the terminal control the signal transmission period and the signal scan mode in accordance with the respective modes, and thus the power consumption can be minimized.

FIGS. 8A to 9F are diagrams explaining a method by a vehicle for determining a location of a terminal while minimizing power consumption according to various embodiments of the disclosure.

Figure 8A:
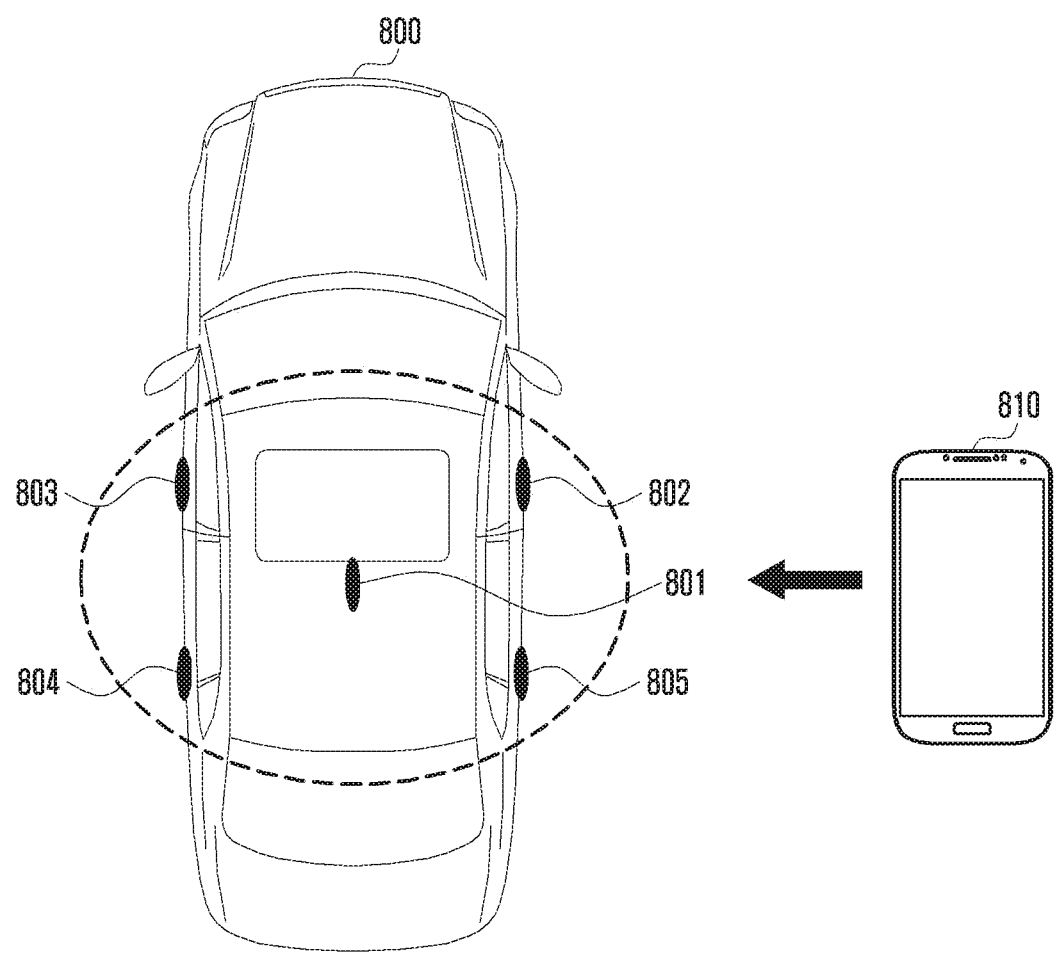
FIG. 8A is a diagram explaining a method by a vehicle for determining a location of a terminal while minimizing power consumption according to various embodiments of the disclosure.

First, FIG. 8A is a diagram illustrating an embodiment in which only a representative communication module of a vehicle 800 is activated. Specifically, the vehicle 800 may determine the first communication module 801 as the representative communication module. The vehicle 800 may control to transmit an advertisement signal using the first communication module 801 that is determined as the representative communication module. The advertisement signal (adv) may be a beacon signal being transmitted in the predetermined period as described above.

As shown in FIG. 8A, it is not detected that the terminal 810 exists in a distance relatively close to the vehicle 800, and thus, in order to minimize the power consumption, the vehicle 800 may control to transmit the advertisement signal (adv) only through the representative communication module.

The vehicle 800 may change the representative communication module in a predetermined period. Further, the vehicle 800 may randomly determine the representative communication module.

Meanwhile, the vehicle 800 may include a separate communication module to be used as the representative communication module. Specifically, a communication module having an omni radiation pattern may be mounted on the vehicle 800 as the representative communication module.

Figure 8B:
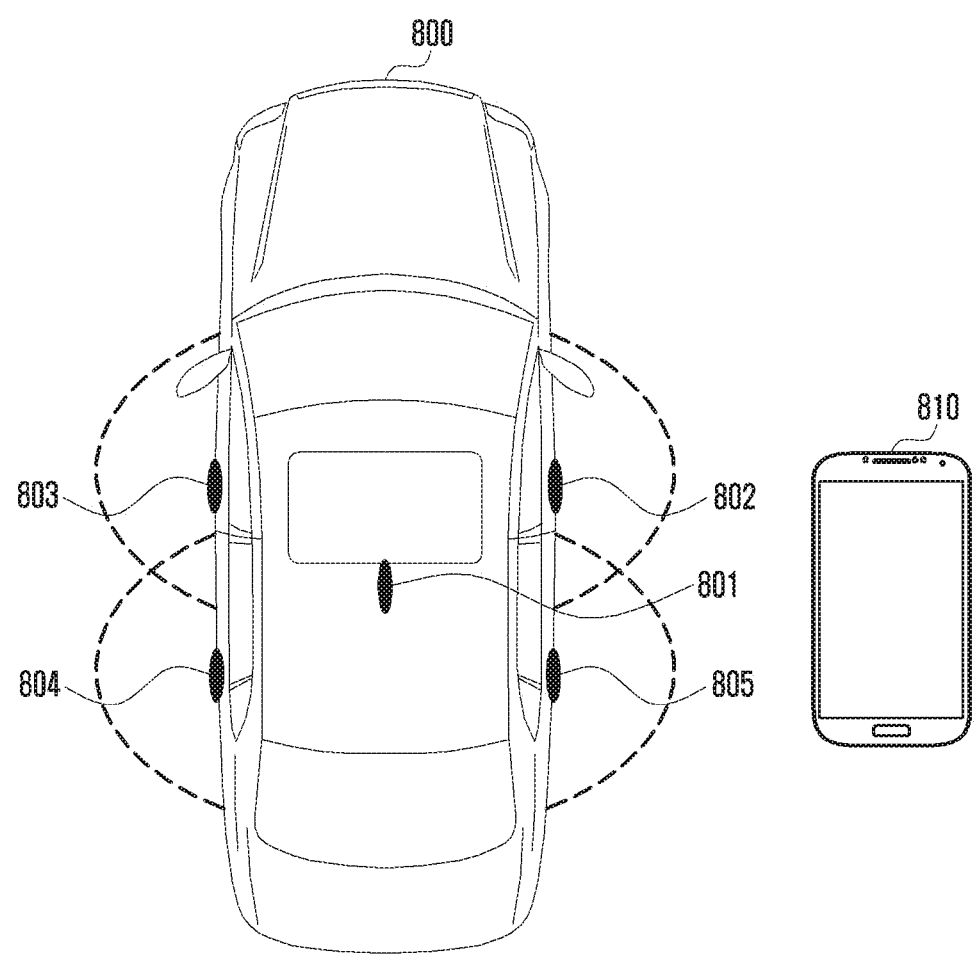
FIG. 8B is a diagram explaining a method by a vehicle for determining a location of a terminal while minimizing power consumption according to various embodiments of the disclosure.

FIG. 8B is a diagram illustrating an embodiment in which all communication modules of the vehicle 800 are activated after the terminal 810 enters a predetermined distance or more from the vehicle 800.

For example, in the case where the vehicle 800 and the terminal 810 perform the authentication procedure and they enter the proximity check mode, the vehicle 800 may activate all communication modules 801 to 805 mounted on the vehicle 800.

Further, if the first communication module 801 is the representative communication module 801 having the omni radiation pattern, the vehicle 800 may active the remaining positioning communication modules 802 to 805 excluding the representative communication module 801.

Even in the case where the first communication module 801 is the representative communication module 801 having the omni radiation pattern, it is possible to activate all the first to fifth communication modules 801 to 805.

According to a power consumption minimization scheme according to another embodiment, as illustrated in FIGS. 9A to 9D, a plurality of communication modules mounted on a vehicle 900 may be activated successively and alternately.

Figure 9A:
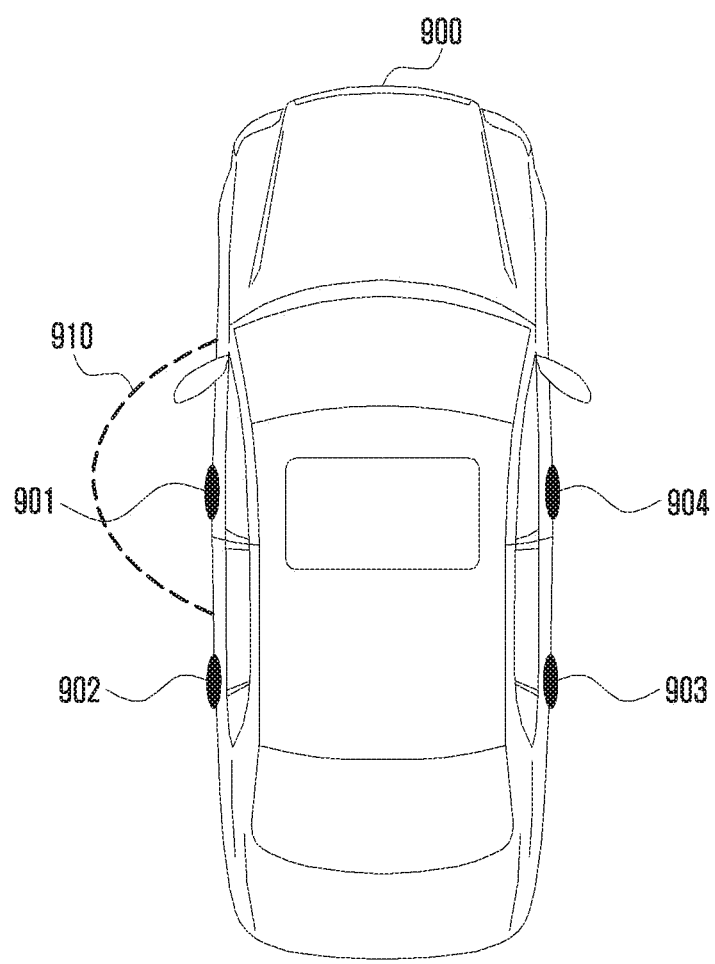
FIG. 9A is a diagram explaining a method by a vehicle for determining a location of a terminal while minimizing power consumption according to various embodiments of the disclosure.

Specifically, FIG. 9A is a diagram illustrating an embodiment in which a first communication module 901 is activated and a vehicle 900 transmits an advertisement signal.

Accordingly, the advertisement signal may be transferred to an area 910 corresponding to the first communication module 901.

Figure 9B:
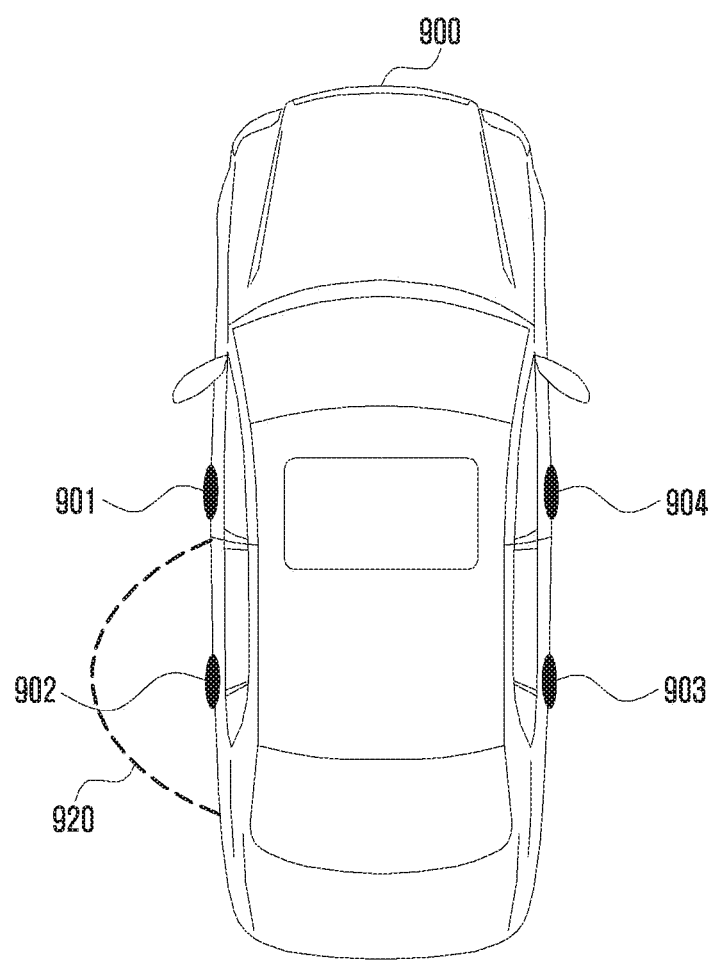
FIG. 9B is a diagram explaining a method by a vehicle for determining a location of a terminal while minimizing power consumption according to various embodiments of the disclosure.

FIG. 9B is a diagram illustrating an embodiment in which a second communication module 902 is activated and a vehicle 900 transmits an advertisement signal. Accordingly, the advertisement signal may be transferred to an area 920 corresponding to the second communication module 902.

Figure 9C:
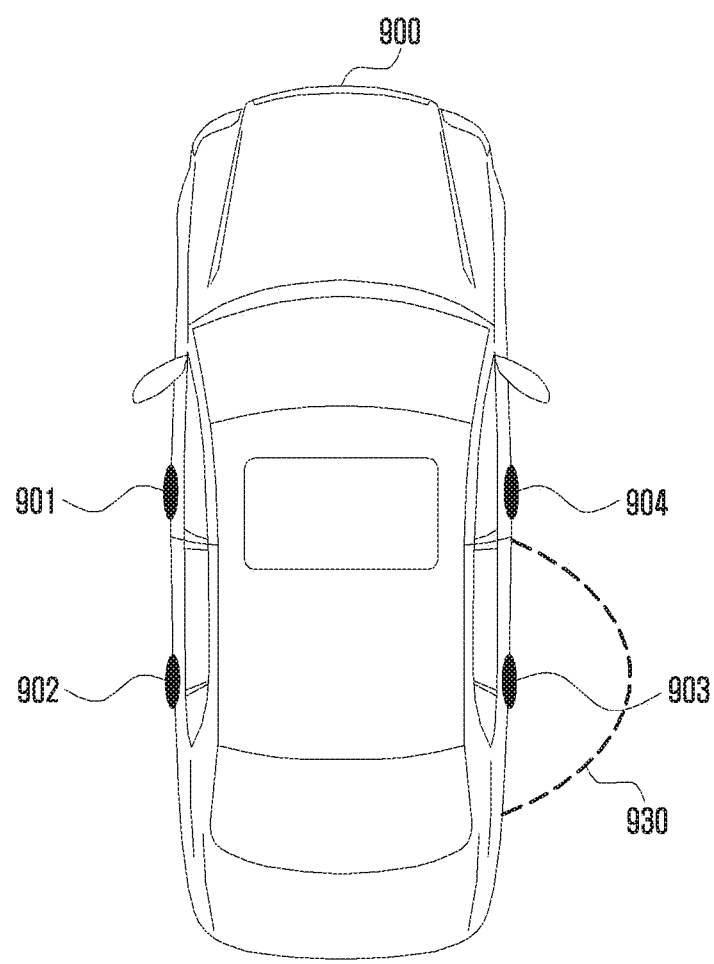
FIG. 9C is a diagram explaining a method by a vehicle for determining a location of a terminal while minimizing power consumption according to various embodiments of the disclosure.

FIG. 9C is a diagram illustrating an embodiment in which a third communication module 903 is activated and a vehicle 900 transmits an advertisement signal. Accordingly, the advertisement signal may be transferred to an area 930 corresponding to the third communication module 903.

Figure 9D:
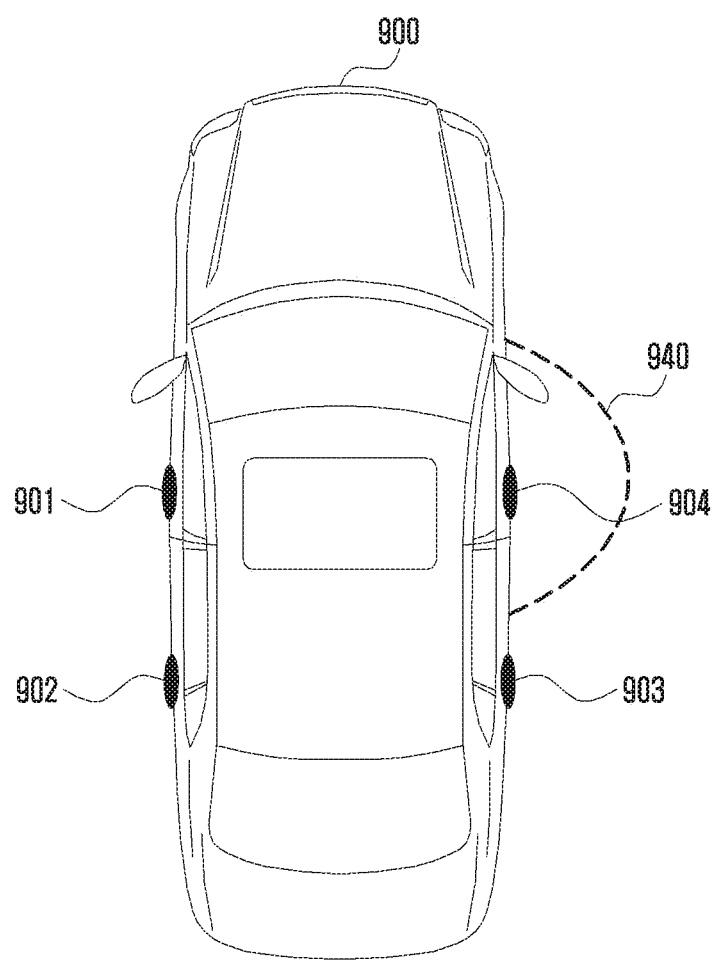
FIG. 9D is a diagram explaining a method by a vehicle for determining a location of a terminal while minimizing power consumption according to various embodiments of the disclosure.

FIG. 9D is a diagram illustrating an embodiment in which a fourth communication module 904 is activated and a vehicle 900 transmits an advertisement signal. Accordingly, the advertisement signal may be transferred to an area 940 corresponding to the fourth communication module 904.

In this case, all of the first to fourth communication modules 901 to 904 may transmit a beacon signal of the same identifier. Accordingly, even if the beacon signal is transmitted through different communication modules, the terminal may receive any signal transmitted through any communication module.

Figure 9E:
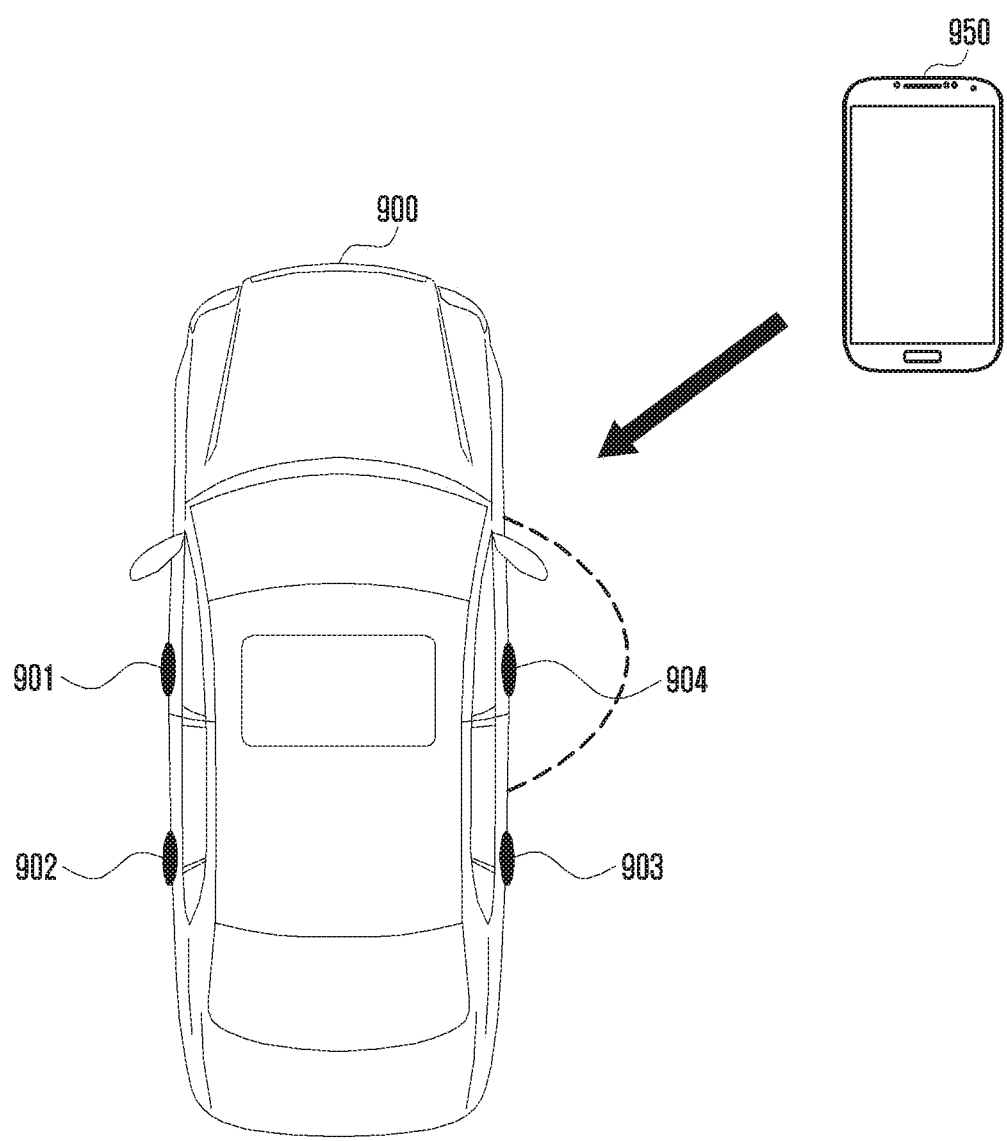
FIG. 9E is a diagram explaining a method by a vehicle for determining a location of a terminal while minimizing power consumption according to various embodiments of the disclosure.

FIG. 9E is a diagram illustrating an embodiment in which a certain communication module is activated in accordance with an entrance direction of a user carrying a terminal 950. Specifically, as described above with reference to FIGS. 9A to 9D, it is exemplified that a plurality of communication modules are successively activated to transmit an advertisement signal. In this case, if the terminal 950 having received the advertisement signal transmitted by the fourth communication module 904 is detected, the vehicle 900 may activate the fourth communication module 904 until the terminal 950 approaches the vehicle 900 within a threshold distance. Accordingly, the vehicle 900 can continuously transmit the advertisement signal to the terminal 950 using the fourth communication module 904. Further, the vehicle 900 may activate the fourth communication module 904, and it may receive the positioning signal transmitted by the terminal 950 using the fourth communication module 904.

Figure 9F:
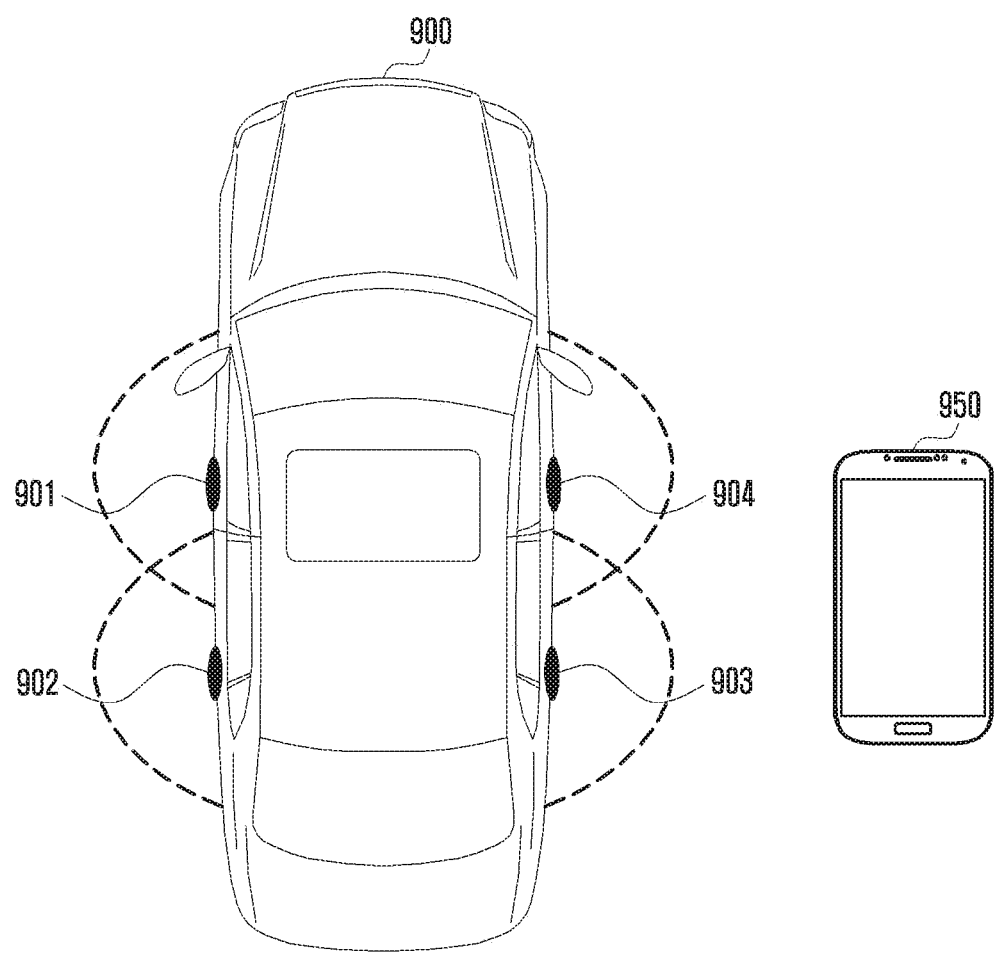
FIG. 9F is a diagram explaining a method by a vehicle for determining a location of a terminal while minimizing power consumption according to various embodiments of the disclosure.

As illustrated in FIG. 9F, if it is determined that the terminal 950 approaches the vehicle 900 over the threshold distance, the vehicle 900 may activate all the communication modules 901 to 904. Further, the vehicle 900 and the terminal 950 may enter the proximity check mode, and the vehicle 900 may receive the positioning signal transmitted by the terminal 950 using all the communication modules 901 to 904.

Figure 10A:
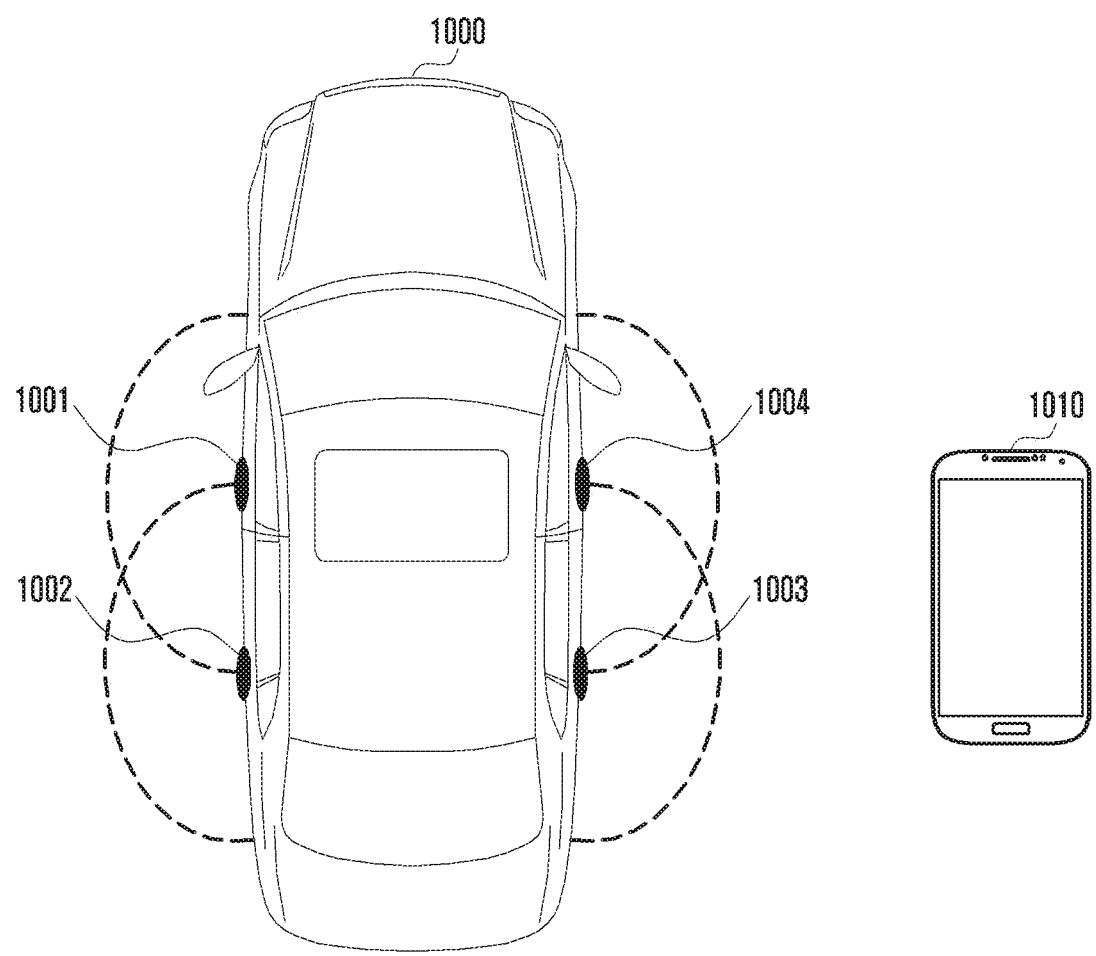
FIG. 10A is a diagram explaining a method for minimizing power consumption in accordance with the location of a terminal.
Figure 10B:
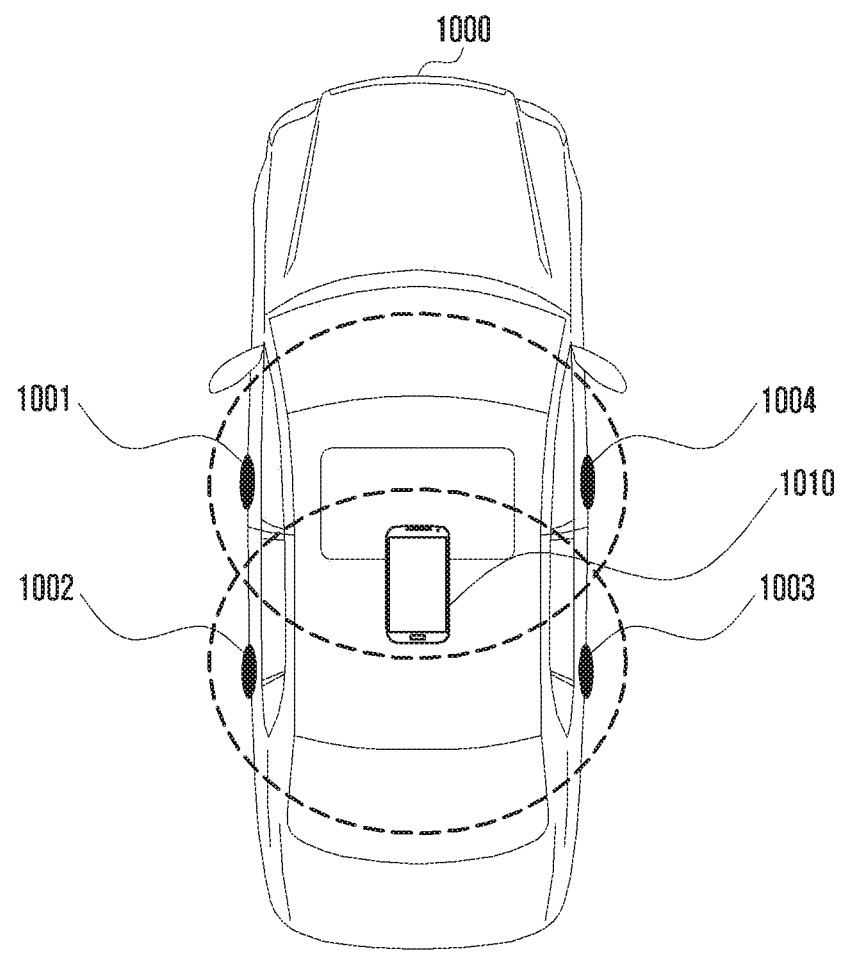
FIG. 10B is a diagram explaining a method for minimizing power consumption in accordance with the location of a terminal.
Figure 10C:
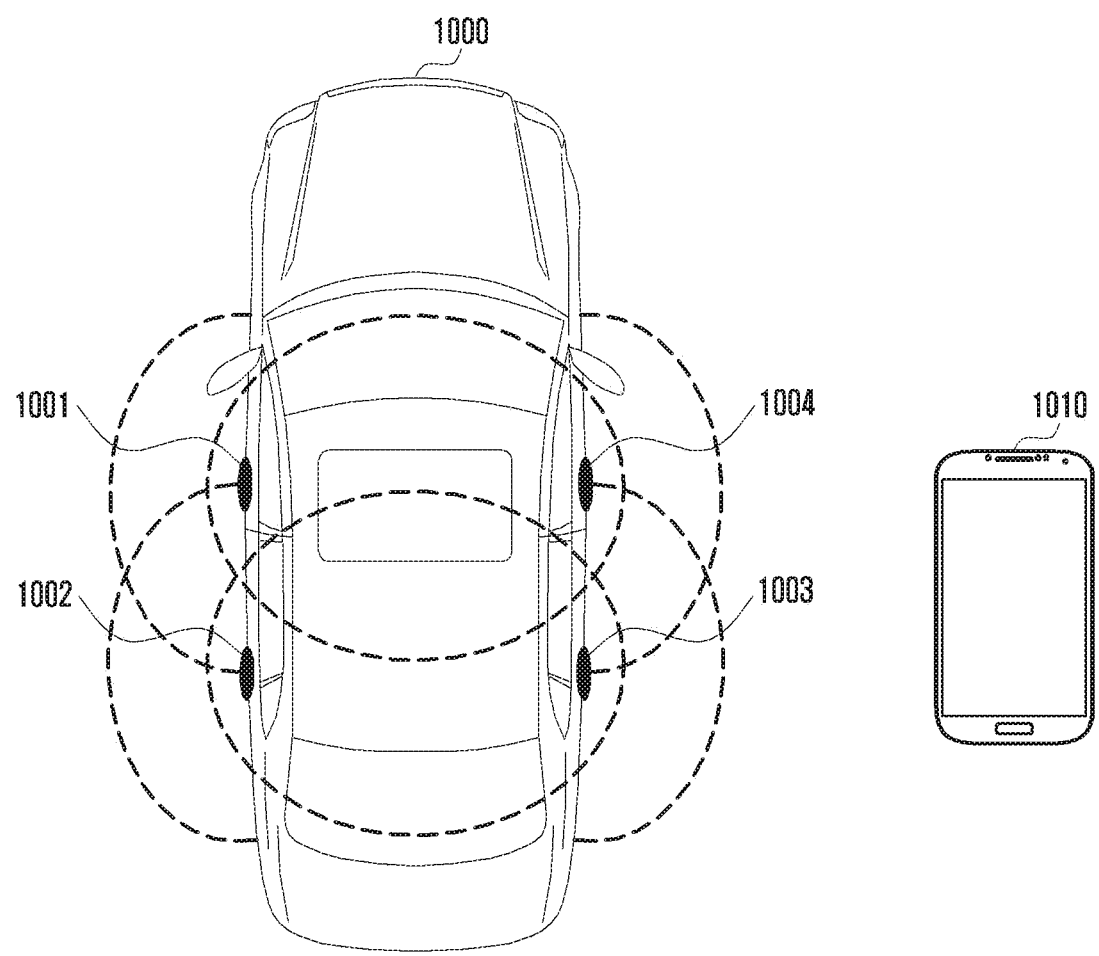
FIG. 10C is a diagram explaining a method for minimizing power consumption in accordance with the location of a terminal.

FIGS. 10A to 10C are diagrams explaining a method for minimizing power consumption in accordance with the location of a terminal. For example, FIGS. 10A to 10C are diagrams illustrating a case where communication modules for measuring outside and inside of a vehicle are respectively mounted on the vehicle or a case where even one communication module can measure outside and inside of the vehicle.

As illustrated in FIG. 10A, if a terminal 1010 exists outside a vehicle 1000, the vehicle 1000 may activate only outside communication modules. Further, the vehicle 1000 may activate only outside measurement functions of communication modules 1001 to 1004.

Meanwhile, as illustrated in FIG. 10B, if the terminal 1010 exists inside the vehicle 1000, the vehicle 1000 may activate only inside communication modules. Further, the vehicle 1000 may activate only the inside measurement functions of the communication modules 1001 to 1004.

However, if it is determined that precision is required in determining the location of the terminal 1010 in the vehicle 1000, the vehicle 1000 may activate all the inside and outside communication modules. Further, the vehicle 1000 may activate the inside and outside measurement functions of the communication modules 1001 to 1004.

Figure 11:
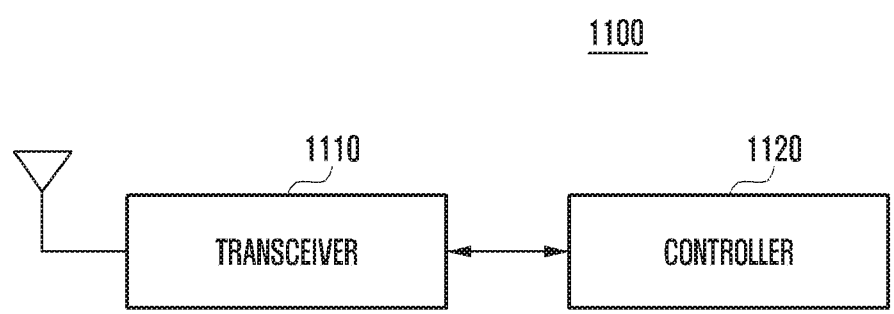
FIG. 11 is a block diagram illustrating constituent elements of a device mounted on a vehicle according to an embodiment of the disclosure.

FIG. 11 is a block diagram illustrating constituent elements of a device 1100 mounted on a vehicle according to an embodiment of the disclosure.

A device 1100 may include a transceiver 1110 and a controller 1120.

The transceiver 1110 is a constituent element for transmitting and receiving signals using a plurality of communication modules. It is not necessary that the plurality of communication modules are included inside the device 1100, and they may be mounted inside or outside the vehicle. The transceiver 1110 may transmit and receive signals using the plurality of communication modules.

The controller 1120 is a constituent element for overall control of the device 1100. If signals are received from the terminal using the plurality of communication modules, the controller 1120 may identify whether the terminal exists within a predetermined distance from the device based on the respective signals received through the plurality of communication modules, and it may change a control mode of the vehicle mounted with the device based on whether the terminal exists within the predetermined distance from the device.

Further, the controller 1120 may change the control mode of the vehicle to a state where a vehicle door is able to be opened or closed if the terminal exists within the predetermined distance from the device 1100, and it may change the control mode of the vehicle to a state where the vehicle door is unable to be opened or closed if the terminal does not exist within the predetermined distance from the device 1100.

Further, the controller 1120 may identify whether the terminal exists inside the vehicle based on the respective signals received through the plurality of communication modules, and it may change the vehicle to be in a state where the vehicle can be started if the terminal exists inside the vehicle.

Further, the controller 1120 may control the transceiver 1110 to transmit an advertisement signal in a predetermined first period using any one of the plurality of communication modules before receiving the signals from the terminal.

Further, the controller 1120 may control the transceiver 1110 to receive the signals from the terminal in a predetermined second period that is shorter than the predetermined first period if an authentication with the terminal is completed using the advertisement signal.

Meanwhile, the controller 1120 may control the transceiver 1110 to alternately turn on certain modules among the plurality of communication modules in accordance with a predetermined order, and it may control the transceiver 1110 to transmit the advertisement signal to the terminal using the turned-on modules.

Further, the controller 1120 may control the transceiver 1110 to identify the communication module whereby the terminal is detected among the plurality of communication modules, to turn on the communication module whereby the terminal is detected, and to receive the signals from the terminal using only the communication module.

Meanwhile, the controller 1120 may control the transceiver 1110 to turn on all of the plurality of communication modules and to receive the signals from the terminal using the plurality of communication modules if it is determined that the terminal exists within the predetermined distance from the device based on the received signals using the communication module whereby the terminal is detected.

The operation of the controller 1120 is not limited to that as described above with reference to FIG. 11, and the controller 1120 may control to perform the overall operation of the vehicle 1100 as described above in the disclosure.

Figure 12:
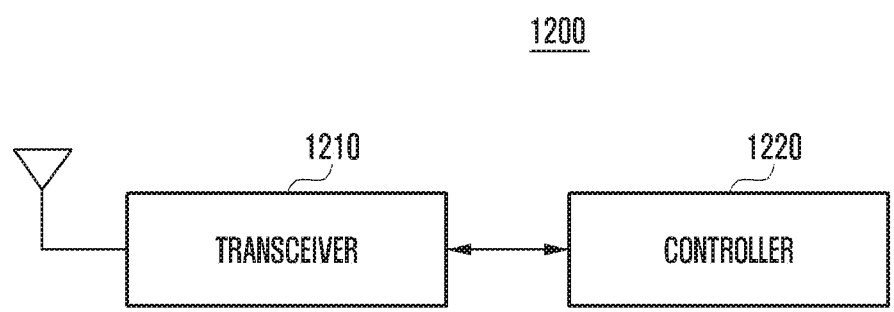
FIG. 12 is a block diagram illustrating constituent elements of a terminal according to an embodiment of the disclosure.

FIG. 12 is a block diagram illustrating constituent elements of a terminal 1200 according to an embodiment of the disclosure.

A terminal 1200 may include a transceiver 1210 and a controller 1220.

The transceiver 1210 is a constituent element for transmitting and receiving signals using at least one communication module.

The controller 1220 is a constituent element for overall control of the terminal 1200.

The controller 1220 may receive an advertisement signal from a device in a predetermined first period, and it may transmit signals in a predetermined second period that is shorter than the predetermined first period if an authentication with the device is completed using the advertisement signal.

If it is determined whether the terminal 1200 exists within a predetermined distance from the device by the device including a plurality of communication modules based on the signals transmitted by the terminal 1200, a control mode of a vehicle mounted with the device may be changed.

Meanwhile, the control mode of the vehicle is changed in a manner that if the terminal 1200 exists within the predetermined distance from the device, the control mode of the vehicle is changed to a state where a vehicle door is able to be opened or closed, whereas if the terminal 1200 does not exist within the predetermined distance from the device, the control mode of the vehicle is changed to a state where the vehicle door is unable to be opened or closed, while if the terminal 1200 exists inside the vehicle, the vehicle is changed to be in a state where the vehicle can be started.

The operation of the controller 1220 is not limited to that as described above with reference to FIG. 12, and the controller 1220 may control to perform the overall operation of the terminal 1200 as described above in the disclosure.

The constituent elements of the terminal or the base station as described above may be implemented by software. For example, the controller of the terminal or the base station may further include a flash memory or other non-volatile memory. Such a nonvolatile memory may store programs for playing roles of the controller.

Further, the controller of the terminal or the base station may be implemented in the form including a CPU and a random access memory (RAM). The CPU of the controller may copy the above-described programs stored in the non-volatile memory into the RAM, and then it may execute the copied programs to perform the functions of the terminal or the base station as described above.

The controller is a configuration in charge of controlling the terminal or the base station. The controller may be interchangeably used to have the same meaning as a central processing unit, a microprocessor, a processor, and an operating system. Further, the controller of the terminal or the base station may be implemented by a system-on-a-chip or a system on chip (SOC or SoC).

On the other hand, the control method by the terminal or the base station according to various embodiments as described above may be coded by software and it may be stored in a non-transitory readable medium. Such a non-transitory readable medium may be mounted on various devices to be used.

The non-transitory readable medium is not a medium for storing data for a short moment, such as a register, a cache, or a memory, but it means a medium that semi-permanently store data and is readable by a device. Specifically, it may be a CD, DVD, hard disk, blu-ray disc, USB, memory card, or ROM.

Meanwhile, preferred embodiments of the disclosure disclosed in this specification and drawings and specific terms used therein are illustrated to present only specific examples in order to clarify the technical contents of the disclosure and help understanding of the disclosure, but are not intended to limit the scope of the disclosure. It will be evident to those skilled in the art that various modifications based on the technical spirit of the disclosure are possible in addition to the disclosed embodiments.

The invention claimed is:

1. A key authentication method performed by a device including a plurality of communication modules, the key authentication method comprising:
   transmitting, to a terminal, at least one advertisement signal for authentication with the terminal using an activated communication module among the plurality of communication modules, wherein each of the plurality of communication modules is activated alternatively according to a predetermined order;
   in case that the authentication with the terminal is completed, receiving, from the terminal, at least one positioning signal using the plurality of communication modules, the at least one positioning signal including at least one of information on a transmission power of the at least one positioning signal and information on a state of the terminal;
   identifying a location of the terminal based on the at least one positioning signal; and
   changing a control mode of a vehicle mounted with the device based on whether the location of the terminal is within a predetermined distance from the device.

2. The key authentication method of claim 1, wherein changing the control mode comprises:
   changing the control mode of the vehicle to a state in which a vehicle door is able to be opened or closed in case that the location of the terminal is within the predetermined distance from the device; and
   changing the control mode of the vehicle to a state in which the vehicle door is unable to be opened or closed in case that the location of the terminal is not within the predetermined distance from the device.

3. The key authentication method of claim 1, further comprising:
   identifying whether the location of the terminal is inside of the vehicle; and
   changing the control mode of the vehicle to a state in which the vehicle can be started in case that the location of the terminal is inside of the vehicle.

4. The key authentication method of claim 1,
   wherein the at least one advertisement signal is transmitted from the device according to a long interval for minimizing power consumption, and
   wherein the at least one positioning signal is received from the terminal according to a short interval for identifying an accurate location of the terminal.

5. The key authentication method of claim 1, wherein receiving the at least one positioning signal comprises:
   identifying a communication module whereby the terminal is detected among the plurality of communication modules;

performing an activation of the communication module whereby the terminal is detected; and receiving, from the terminal, the at least one positioning signal using the communication module whereby the terminal is detected.

6. The key authentication method of claim 5, further comprising:

performing an activation of all of the plurality of communication modules in case that the location of the terminal is within the predetermined distance from the device; and receiving, from the terminal, the at least one positioning signal using all of the plurality of communication modules.

7. A key authentication method performed by a terminal, the key authentication method comprising:

receiving, from a device including a plurality of communication modules, at least one advertisement signal for authentication with the device according to a long interval; and in case that the authentication with the device is completed, transmitting, to the device, at least one positioning signal according to a short interval the at least one positioning signal including at least one of information on a transmission power of the at least one positioning signal and information on a state of the terminal, wherein the at least one advertisement signal is received from the device by using an activated communication module among the plurality of communication modules, wherein each of the plurality of communication modules is activated alternatively according to a predetermined order, wherein a control mode of a vehicle mounted with the device is changed based on whether a location of the terminal is within a predetermined distance from the device, the location of the terminal being identified based on the at least one positioning signal, wherein the control mode of the vehicle is changed to a state in which a vehicle door is able to be opened or closed in case that the location of the terminal is within the predetermined distance from the device, wherein the control mode of the vehicle is changed to a state in which the vehicle door is unable to be opened or closed in case that the location of the terminal is not within the predetermined distance from the device, and wherein the control mode of the vehicle is changed to a state in which the vehicle can be started in case that the location of the terminal is inside of the vehicle.

8. A device comprising:

a transceiver comprising a plurality of communication modules; and a controller coupled with the transceiver and configured to:

transmit, to a terminal, at least one advertisement signal for authentication with the terminal using an activated communication module among the plurality of communication modules, wherein each of the plurality of communication modules is activated alternatively according to a predetermined order, in case that the authentication with the terminal is completed, receive, from the terminal, at least one positioning signal using the plurality of communication modules, the at least one positioning signal including at least one of information on a transmission power of the at least one positioning signal and information on a state of the terminal, identify a location of the terminal based on the at least one positioning signal, and change a control mode of a vehicle mounted with the device based on whether the location of the terminal is within a predetermined distance from the device.

9. The device of claim 8, wherein the controller is further configured to:

change the control mode of the vehicle to a state in which a vehicle door is able to be opened or closed case that the location of the terminal is within the predetermined distance from the device, and change the control mode of the vehicle to a state in which the vehicle door is unable to be opened or closed case that the location of the terminal is not within the predetermined distance from the device.

10. The device of claim 8, wherein the controller is further configured to:

identify whether the location of the terminal is inside of the vehicle, and change the control mode of the vehicle to a state in which the vehicle can be started in case that the location of the terminal is inside of the vehicle.

11. The device of claim 8, wherein the at least one advertisement signal is transmitted from the device according to a long interval for minimizing power consumption, and wherein the at least one positioning signal is received from the terminal according to a short interval for identifying an accurate location of the terminal.

12. The device of claim 8, wherein the controller is further configured to:

identify a communication module whereby the terminal is detected among the plurality of communication modules, perform an activation of the communication module whereby the terminal is detected, and receive, from the terminal, the at least one positioning signal using the communication module whereby the terminal is detected.

13. The device of claim 12, wherein the controller is further configured to:

perform an activation of all of the plurality of communication modules in case that the location of the terminal is within the predetermined distance from the device, and receive, from the terminal, the at least one positioning signal using all of the plurality of communication modules.

14. A terminal comprising:

a transceiver; and a controller coupled with the transceiver and configured to:

receive, from a device including a plurality of communication modules, at least one advertisement signal for authentication with the device according to a long interval, and in case that the authentication with the device is completed, transmit, to the device, at least one positioning signals according to a short interval, the at least one positioning signal including at least one of information on a transmission power of the at least one positioning signal and information on a state of the terminal, wherein the at least one advertisement signal is received from the device by using an activated communication module among the plurality of communication modules, wherein each of the plurality of communication modules is activated alternatively according to a predetermined order, and wherein a control mode of a vehicle mounted with the device is changed based on whether a location of the terminal is within a predetermined distance from the device, the location of the terminal being identified based on the at least one positioning signal.

15. The terminal of claim 14, wherein the control mode of the vehicle is changed to a state in which a vehicle door is able to be opened or closed in case that the location of the terminal is within the predetermined distance from the device, wherein the control mode of the vehicle is changed to a state in which the vehicle door is unable to be opened or closed in case that the location of the terminal is not within the predetermined distance from the device, and wherein the control mode of the vehicle is changed to a state in which the vehicle can be started in case that the location of the terminal is inside of the vehicle.

* * * * *